(12) United States Patent
Dougherty et al.

(10) Patent No.: US 9,449,523 B2
(45) Date of Patent: Sep. 20, 2016

(54) SYSTEMS AND METHODS FOR NARRATING ELECTRONIC BOOKS

(75) Inventors: Casey Maureen Dougherty, San Francisco, CA (US); Gregory Robbin, Mountain View, CA (US); Melissa Breglio Hajj, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 443 days.

(21) Appl. No.: 13/535,272

(22) Filed: Jun. 27, 2012

(65) Prior Publication Data

US 2014/0007257 A1    Jan. 2, 2014

(51) Int. Cl.
*H04L 29/06* (2006.01)
*G09B 5/06* (2006.01)

(52) U.S. Cl.
CPC .................................. *G09B 5/062* (2013.01)

(58) Field of Classification Search
CPC .............................. G10L 15/26; G09B 5/062
USPC ............................ 726/26–28; 704/207, 260
See application file for complete search history.

(56) References Cited

U.S. PATENT DOCUMENTS

| 5,640,552 | A | 6/1997 | Yianilos | |
| 8,484,027 | B1 * | 7/2013 | Murphy | 704/258 |
| 8,548,618 | B1 * | 10/2013 | Story et al. | 700/94 |
| 9,002,703 | B1 * | 4/2015 | Crosley | 704/207 |
| 2007/0088712 | A1 * | 4/2007 | Watson et al. | 707/10 |
| 2008/0168154 | A1 * | 7/2008 | Skyrm | H04L 65/601 709/218 |
| 2009/0254826 | A1 * | 10/2009 | Schwab et al. | 715/716 |
| 2009/0319885 | A1 * | 12/2009 | Amento et al. | 715/230 |
| 2009/0326948 | A1 * | 12/2009 | Agarwal et al. | 704/260 |
| 2010/0088746 | A1 * | 4/2010 | Kota et al. | 726/3 |
| 2010/0251386 | A1 * | 9/2010 | Gilzean et al. | 726/28 |
| 2010/0318364 | A1 * | 12/2010 | Kurzweil et al. | 704/260 |
| 2011/0093103 | A1 | 4/2011 | Chuang et al. | |
| 2012/0239758 | A1 * | 9/2012 | Dzmitrenka et al. | 709/206 |

FOREIGN PATENT DOCUMENTS

| WO | 02/17040 A2 | 2/2002 |
| WO | 02/097781 A1 | 12/2002 |
| WO | 2006/041932 A2 | 4/2006 |
| WO | 2010/083354 A1 | 7/2010 |

* cited by examiner

*Primary Examiner* — Izunna Okeke
*Assistant Examiner* — Hee Song
(74) *Attorney, Agent, or Firm* — Polsinelli LLP

(57) ABSTRACT

A narration session between a plurality of participants can be set up to allow participants to collaboratively narrate an electronic book. Information can be transmitted to each participant so that the views of the participants remain in sync. Visual cues can also be transmitted to notify a participant of text that is to read aloud and audio snippets of read text are collected to form a narration file. Participants without access rights to the electronic book can be granted temporary rights.

40 Claims, 14 Drawing Sheets

FIG. 9

SYSTEMS AND METHODS FOR NARRATING ELECTRONIC BOOKS

BACKGROUND

1. Technical Field

The present disclosure relates generally to providing digital media and more specifically to techniques and systems for narrating electronic books available on an online store.

2. Introduction

In the digital age, electronic devices capable of playing digital media have become commonplace. These devices, which include laptop computers, handheld digital media players, smart phones, and handheld gaming systems, appeal to a wide demographic and are used daily. The popularity of these electronic devices has led to growth and diversity of digital media available for these devices.

Recently, there has been a growth in the number of electronic books (eBooks), particularly eBooks for children. A caretaker already carrying a personal electronic device for work or pleasure can prefer storing children's eBooks on the device over traditional children's books since it minimizes the number of items that the caretaker must carry. Moreover, eBooks on an electronic device can be more durable in the hands of an infant or child than a traditional book. eBooks can also be more user-friendly and easier to operate. For example, a read aloud feature of an eBook is more customizable than a traditional read aloud book. While there have been many advancements in the development of eBooks, there is still a need for improved techniques for distributing and narrating eBooks.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for narrating and gifting eBooks. A narrator can narrate an entire eBook or a portion of an eBook for a recipient. The narrator can read aloud text in an eBook and an audio snippet can be created and associated with the text read. Default audio snippets can be associated with non-narrated portions of the eBook. The default audio snippets can be generated by the online store or a narrator's device. Alternatively, the default audio snippets can be pre-generated by the publisher and attached to the eBook. The default audio snippets and the narrator generated audio snippets can be combined to form a narration file. The narration file can be stored on an online store and access to the narration file and the eBook can be granted to the recipient. In some examples, a narrator can be granted temporary access to an eBook when the narrator does not own a copy of the eBook. In other examples, the narrator and the recipient can perform a live narration through screen sharing. In yet other examples, a video feed of the narrator or the recipient can be presented to both parties.

In another embodiment, a narration session can be created for multiple participants to collaboratively narrate an eBook. The narration session can be organized by one of the participants or alternatively the online store. Participants of the narration session can each be assigned a narration role. When it is time for a participant to read aloud text associated with a narration role, visual cues can be presented to the participant. After the text is read aloud and an audio snippet is generated, the audio snippet can be transmitted or broadcasted to other participants. This can ensure that the display is in sync for all participants. Visual cues of different colors or schemes can be applied to text in the eBook to clarify a participant's role in narrating the text. For example, each participant can have a narration profile that specifies a color highlighting with an avatar that is to be used during the narration session. Text can be associated with a narration role according to metadata in the eBook or alternatively through special keywords, characters, etc to help identify, differentiate, and group narration roles.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9 illustrates an example of multiple narrators narrating a page of an eBook.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for systems, techniques, and methods for creating narrations for electronic books (eBooks) and distributing the narrated eBooks. The eBooks include various types of written works in digital form. For example, the eBooks can include children's books, dictionaries, encyclopedias, documentaries, and various types of fiction or nonfiction literature. While the disclosure focuses on the narration of eBooks, it is to be understood by a person of ordinary skill in the relevant art that these teachings can also be applied to other digital works such as photos and images that may benefit from narration. For example, narration can be created and attached to plaques near objects in museums.

A server can receive a narration of an eBook from a narrator. The eBook and narration can be processed by the server to create a new eBook. In some examples, a narrator does not need to own a copy of the eBook to narrate the eBook. For example, temporary rights to view an eBook similar to a rental can be granted to the narrator. This allows the narrator to create a narration for an eBook without owning the eBook.

A system is also disclosed for creating a live narration. A live narration is when a narrator narrates the eBook to a recipient in real time. During a live narration, the recipient and the narrator can be operating devices which are remote from one another. Thus, a live stream or other communication channel can be set up through a server or a network to host and optionally capture the live narration. In one example, screen sharing can be used so that a narrator who does not own a copy of the eBook can simultaneously view a copy of the eBook owned by the recipient of the narration. In another example, a narrator who does not own a copy of the eBook can be granted temporary rights to view the eBook.

Figure 1:
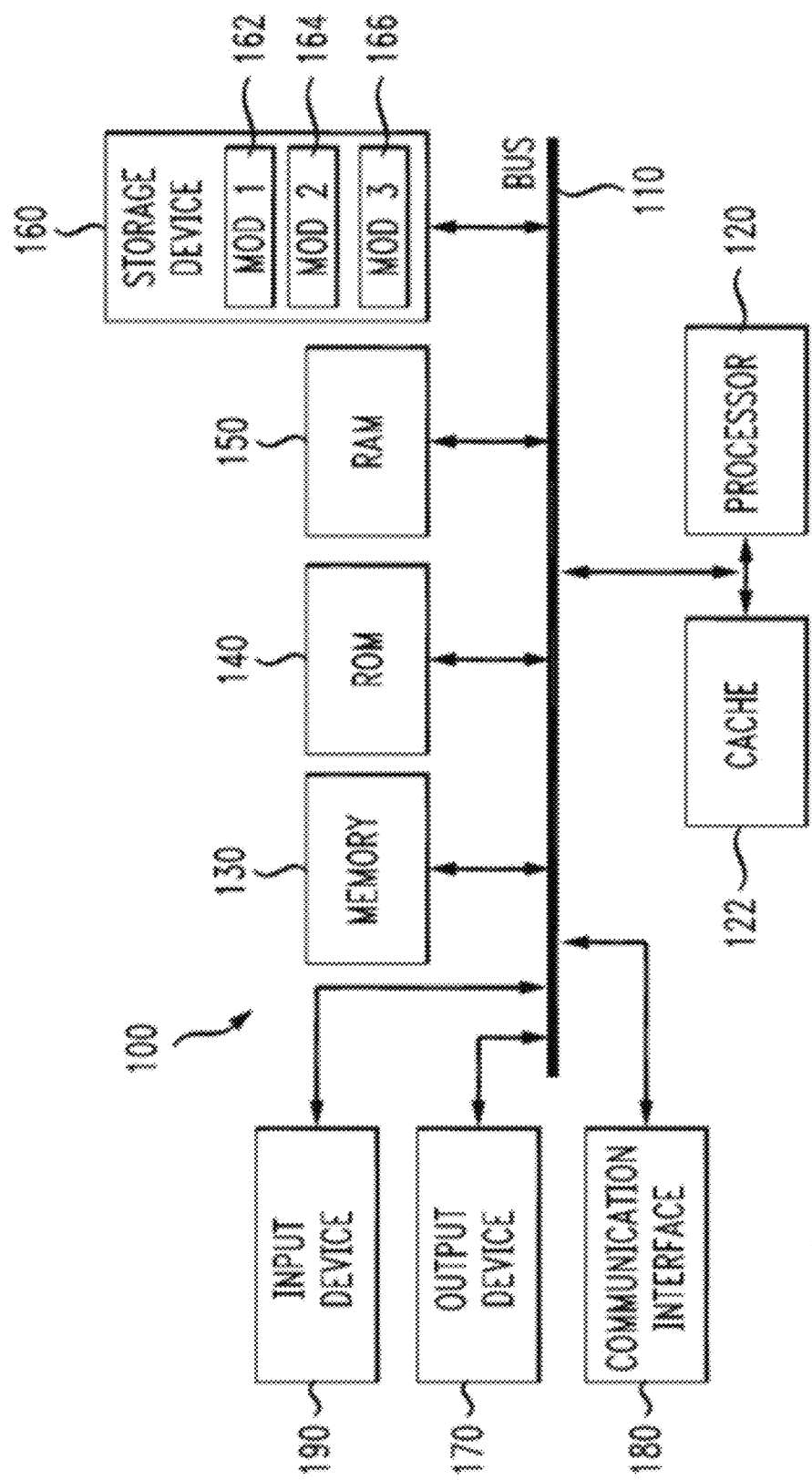
FIG. 1 illustrates an exemplary system embodiment.

In other examples, a system is disclosed that is configured to host and capture a group narration. A group narration is when multiple parties collaborate in the narration of an eBook. For example, multiple parties may collaborate to each read a role in a play. A group narration session can be created by a server to host the group narration. A detailed discussion of the methods and systems surrounding the concept of creating and distributing narrations is described below. First, a brief introductory description of a basic general purpose system or computing device which can be employed to practice the concepts is illustrated in FIG. 1. This is followed by an introductory description of a cloud computing system in FIG. 2. A detailed description of techniques for creating orders and reservations follow. Several variations shall be discussed herein as the various embodiments are set forth. The disclosure now turns to FIG. 1.

General System

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, a solid state drive, a tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide non-volatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations. Having disclosed some components of a computing system, the disclosure now turns to a description of cloud computing.

Cloud Computing System

Figure 2:
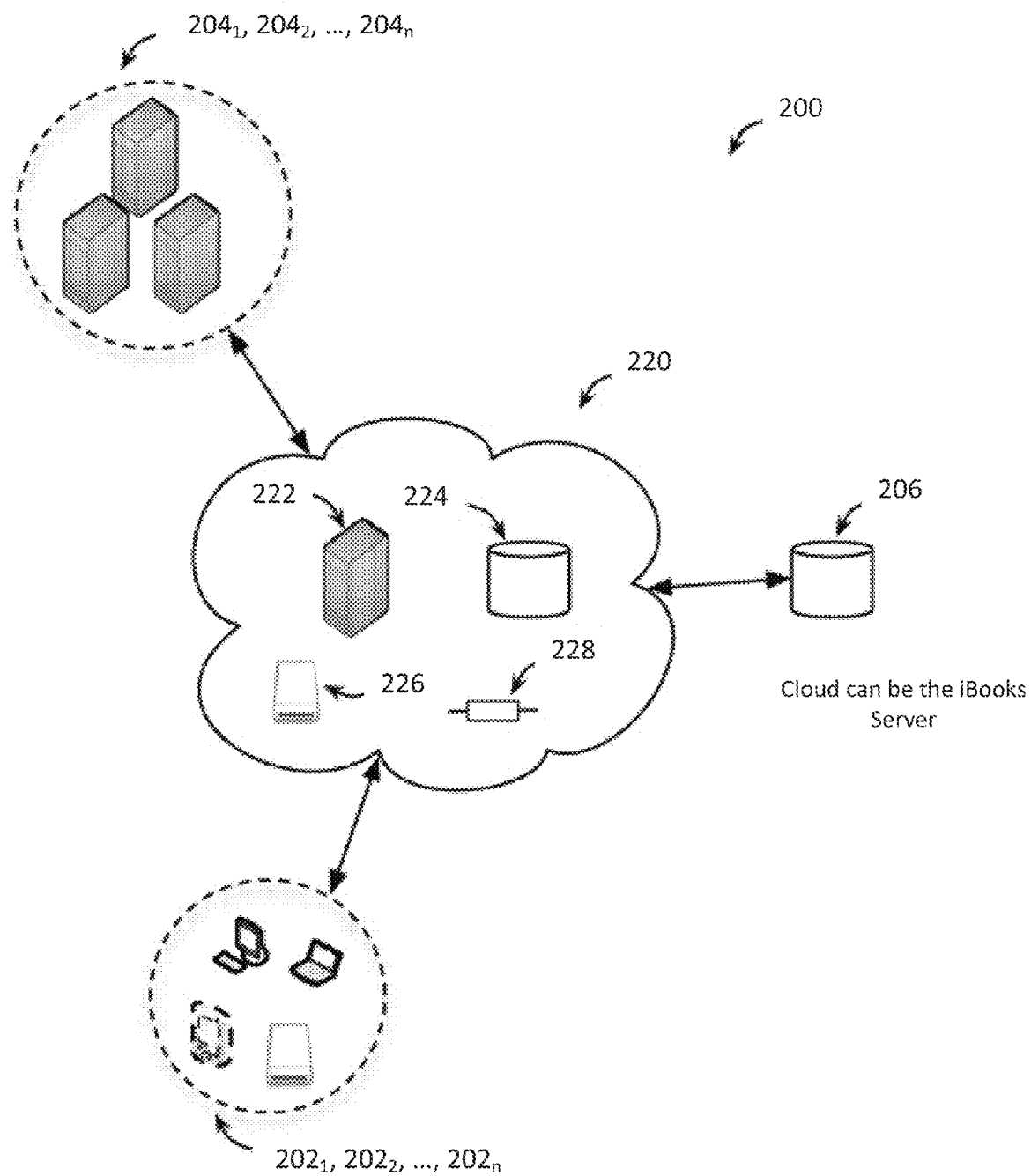
FIG. 2 illustrates an exemplary cloud computing system.

Cloud computing is a type of Internet-based computing in which a variety of resources are hosted and/or controlled by an entity and made available by the entity to authorized users via the Internet. An exemplary cloud computing system configuration 200 is illustrated in FIG. 2 wherein a variety of electronic devices can communicate via a network for purposes of exchanging content and other data. The system can be configured for use on a wide variety of network configurations that facilitate the intercommunication of electronic devices. For example, each of the components of system 200 in FIG. 2 can be implemented in a localized or distributed fashion in a network.

System 200 can be configured to include cloud computing resources 220 (i.e., "the cloud"). The cloud resources can include a variety of hardware and/or software resources, such as cloud servers 222, cloud databases 224, cloud storage 226, cloud networks 228, cloud applications, cloud platforms, and/or any other cloud-based resources. In some cases, the cloud resources are distributed. For example, cloud storage 226 can include multiple storage devices. In some cases, cloud resources can be distributed across multiple cloud computing systems and/or individual network enabled computing devices. For example, cloud computing resources 220 can communicate with servers $204_1$, $204_2, \ldots, 204_n$ (collectively "204"), database 206, and/or any other network enabled computing device to provide the cloud resources.

Furthermore, in some cases, the cloud resources can be redundant. For example, if cloud computing resources 220 are configured to provide data backup services, multiple copies of the data can be stored such that the data is still be available to the user even if a storage resource is offline, busy, or otherwise unavailable to process a request. In another example, if cloud computing resources 220 is configured to provide software, the software can be available from different cloud servers so that the software can be served from any of the different cloud servers. Algorithms can be applied such that the selection criteria such as the closest server, the server with the lowest current load, or other selection criteria, etc. is used to select a server to process a given request.

In system 200, a user interacts with cloud computing resources 220 through user terminals $202_1, 202_2, \ldots, 202_n$ (collectively "202") connected to a network by direct and/or indirect communication. Cloud computing resources 220 can support connections from a variety of different electronic devices, such as servers; desktop computers; mobile computers; handheld communications devices, e.g., mobile phones, smart phones, tablets; set top boxes; network-enabled hard drives; and/or any other network-enabled computing devices. Furthermore, cloud computing resources 220 can concurrently accept connections from and interact with multiple electronic devices. Interaction with the multiple electronic devices can be prioritized or occur simultaneously.

Cloud computing resources 220 can provide cloud resources through a variety of deployment models, such as public, private, community, hybrid, and/or any other cloud deployment model. In some cases, cloud computing resources 220 can support multiple deployment models. For example, cloud computing resources 220 can provide one set of resources through a public deployment model and another set of resources through a private deployment model.

In some configurations, a user terminal 202 can access cloud computing resources 220 from any location where an Internet connection is available. However, in other cases, cloud computing resources 220 can be configured to restrict access to certain resources such that a resource can only be accessed from certain locations. For example, if cloud computing resources 220 are configured to provide a resource using a private deployment model, then cloud computing resources 220 can restrict access to the resource, such as by requiring that a user terminal 202 access the resource from behind a firewall.

Cloud computing resources 220 can provide cloud resources to user terminals 202 through a variety of service models, such as Software as a Service (SaaS), Platforms as a service (PaaS), Infrastructure as a Service (IaaS), and/or any other cloud service models. In some cases, cloud computing resources 220 can provide multiple service models to a user terminal 202. For example, cloud computing resources 220 can provide both SaaS and IaaS to a user terminal 202. In some cases, cloud computing resources 220 can provide different service models to different user terminals 202. For example, cloud computing resources 220 can provide SaaS to user terminal 2021 and PaaS to user terminal 2022.

In some cases, cloud computing resources 220 can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources 220 such as servers 204 or database 206.

Cloud computing resources 220 can provide a variety of functionality that requires user interaction. Accordingly, a user interface (UI) can be provided for communicating with cloud computing resources 220 and/or performing tasks associated with the cloud resources. The UI can be accessed via an end user terminal 202 in communication with cloud computing resources 220. The UI can be configured to operate in a variety of client modes, including a fat client mode, a thin client mode, or a hybrid client mode, depending on the storage and processing capabilities of cloud computing resources 220 and/or the user terminal 202. Therefore, a UI can be implemented as a standalone application operating at the user terminal in some embodiments. In other embodiments, a web browser-based portal can be used to provide the UI. Any other configuration to access cloud computing resources 220 can also be used in the various embodiments.

As described above, in some configurations, the cloud computing resources can be used to store user data. The present disclosure contemplates that, in some instances, this gathered data might include personal and/or sensitive data. The present disclosure further contemplates that the entities responsible for the collection, analysis, disclosure, transfer, storage, or other use of such data should implement and consistently use privacy policies and practices that are generally recognized meeting or exceeding industry or governmental requirements for maintaining personal information data private and secure. For example, personal data from users should be collected for legitimate and reasonable uses of the entity and not shared or sold outside of those legitimate uses. Further, such collection should occur only after the informed consent of the users. Additionally, such entities should take any needed steps for safeguarding and securing access to such personal data and ensuring that others with access to the personal data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal data. That is, the present disclosure contemplates that hardware and/or software elements can be provided to prevent or block access to such personal data. For example, the present technology can be configured to allow users to select the data that is stored in cloud storage. In another example, the present technology can also be configured to allow a user to specify the data stored in cloud storage that can be shared with other users.

Therefore, although the present disclosure broadly covers use of personal data to implement one or more various disclosed embodiments, the present disclosure also contemplates that the various embodiments can also be implemented without the need for accessing such personal data. That is, the various embodiments of the present technology are not rendered inoperable due to the lack of all or a portion of such personal data. For example, non-personal data can be stored in cloud storage.

Creating a Narration

Figure 3:
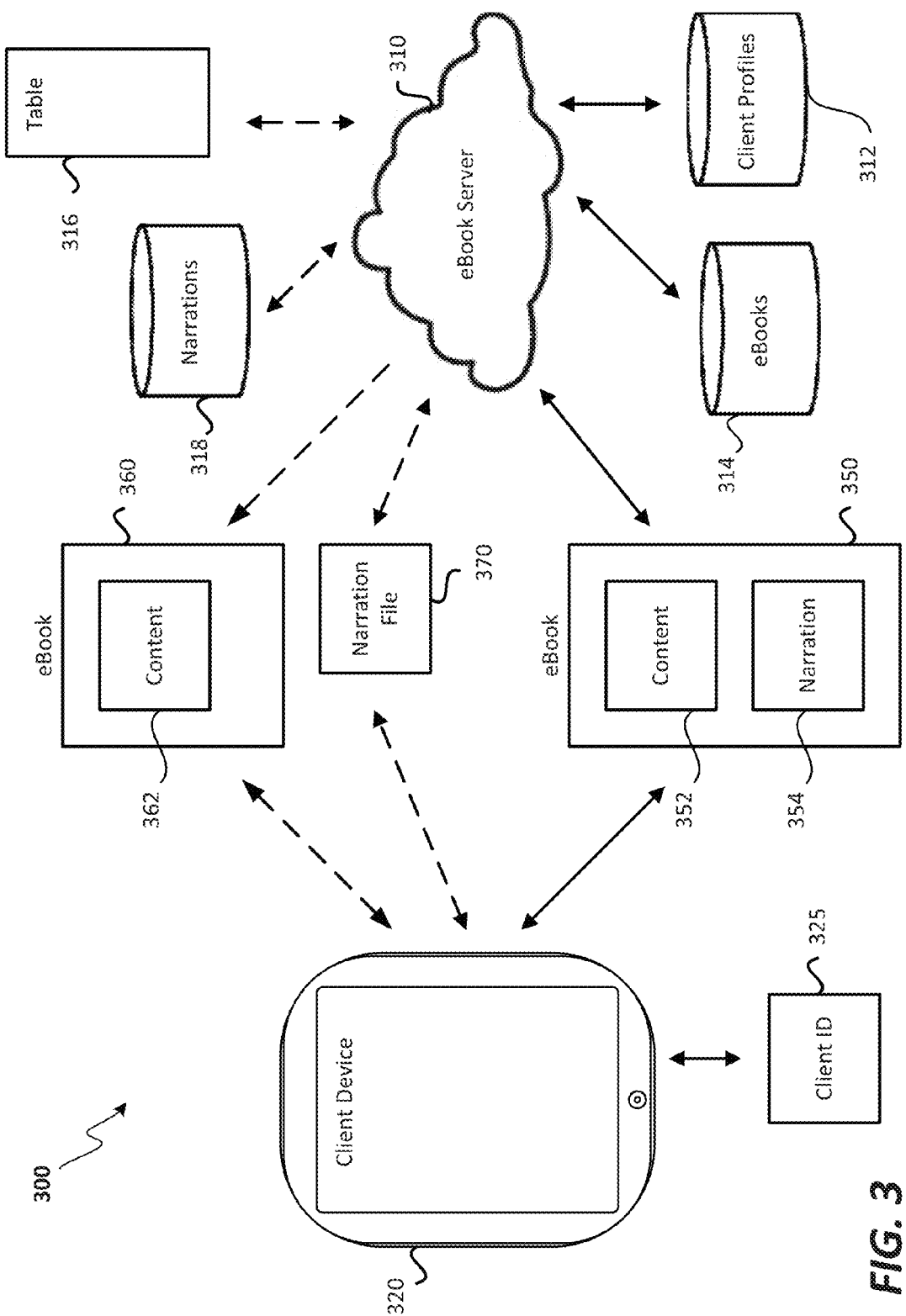
FIG. 3 illustrates an exemplary eBook distribution system.

FIG. 3 illustrates an exemplary eBook distribution system. Distribution system 300 includes eBook server 310 and client device 320. eBook server 310 can be configured to operate as part of an online digital media store and comprise of one or more of the cloud resources described in FIG. 2. eBook server 310 can be configured to manage client profiles database 312 and eBooks database 314. The client profiles can specify the eBooks that are associated to or belong to a particular client (i.e., customer of the online store). eBooks associated to a particular client can be downloaded and re-downloaded to devices associated with the client/customer. For example, a customer of an online digital media store can have an associated client profile that is stored in client profiles database 312. The client profile can include payment information, personal information of the user, and/or a list of eBooks that the user owns or has the right to perform. When users purchase a copy of an eBook, eBook server 310 can grant the customer's client profile a subscription or right of use to the eBook. eBooks that the customer owns or are associated with the customer can be downloaded to one or more devices associated with the client profile or customer. If the customer were to delete the eBook from the device, the eBook can be re-downloaded to the device so long as the device is associated with the customer in the client profile database 312. Each eBook in eBooks database 314 can include an identifier (e.g., AdamID) used to identify the eBook. The identifier can be used to identify a particular eBook. For example, eBooks can be associated to a client profile based on the identifier of the eBooks. Client device 320 can also be associated with client ID 325, which is configured to identify the customer that is currently logged into or operating client device 320. When client device 320 communicates with eBook server 310, client ID 325 can be transmitted along with the communication so that eBook server 310 can identify the operator of client device 320.

Client device 320 can be an electronic device that is associated with or operated by a customer of the online store. Client device 320 can include components typically found in electronic devices such as those illustrated and discussed with respect to FIG. 1. Client device 320 can playback an eBook. If the eBook includes audio narration, audio signals can be generated and outputted by client device 320. Client device 320 can be configured to communicate with the eBook server 310 directly (e.g., direct connection between client device and eBook server) or indirectly through a network (e.g., internet, LAN, WAN). The communications can include transmitting eBooks to and from client device 320 and eBook server 310. Some of the eBooks may have narration while others may not. For eBooks that have narration, the narration can be stored along with the content of the eBook in a single package or file. For example, eBook 350 includes content 352 and narration 354. The content and narration can be associated with one another, such that parts of the narration are linked to particular characters, numbers, words, text blocks, or other elements of the eBook. For instance, depending on the configuration of the eBook, an audio clip from the narration can be linked to a word, sentence, paragraph, page, or chapter of the eBook. An eBook can have multiple copies stored in eBooks database 314. Each variation of an eBook can have its own identifier and be stored separately in eBooks database 314. For example, eBooks database 314 can store a copy of an eBook without narration, another copy of the eBook with a first narration, and another copy of the eBook with a second narration file. Thus, each variation can have its own identifier. This can allow the eBook server to assign a copy of the eBook with a first narration to a customer without granting the customer access to the second narration.

Alternatively, the narration can be stored independently from the eBook. For example, eBook 360 includes content 362. Narrations of eBook 360 are not incorporated into the eBook but instead are stored in an independent file. Here, narration file 370 is a narration of eBook 360. Narration file 370 can be configured to provide audio, or more specifically narration, for content 362 of eBook 360. As described above, the narration can be linked to a word, sentence, paragraph, page, chapter, or other element (including images) of the content in the eBook. The granularity of the relationship between narration file 370 and content 362 of eBook 360 can depend on the eBook, the narration file, or the configuration of the client device. Narration file 370 can be stored in narrations database 318. Each narration file can be associated with a unique identifier which can be used to identify, store, or retrieve a narration file from narrations database 318. To determine which narrations are accessible to a customer, table 316 or other data structure can be used to map a customer to one or more narration identifiers. By storing the narrations separately from the eBook, a single copy of the eBook can be stored in eBooks database 314 (in comparison to multiple copies as discussed above) since narrations are managed separately from eBook access rights. For example, the AdamID (a unique identifier used by a server to differentiate and locate eBooks) of an eBook can be associated with the client profile of a first and second customer. Thus, both customers can access the eBook. A look-up of the second customer's user account ID in table 316 returns a narration identifier. The narration identifier grants the second customer rights to download the narration associated with the narration identifier from narrations database 318. If the second customer is associated with multiple narration files for this eBook, the client device operated by the second customer can be configured to allow a customer to select a particular narration.

In one embodiment, access to narrations can be controlled. For example, a mother creating a narration for her child may wish to have that narration only available to her child. As a result, the mother may wish to be the only party capable of gifting or giving access rights to the narration. Here, system 300 can include another table (not shown) configured to look up a list of users that have a right to gift a narration file based on the narration identifier. For example, the table can receive a narration identifier associated with a narration and return a list of users who have the right to gift this narration. This can prevent narrations created by a narration from being gifted to recipients unbeknownst to the narrator. Alternatively, the table can receive a user account ID and return a list of narrations that the user has a right to gift to others. This can allow system 300 to determine available narrations to gift based on a user account ID. In one example, only the creator of the narration can purchase and grant rights to the narration. The creator would purchase copies of the eBook with the particular narration and gift the eBook to the desired recipients.

In this example, eBook 350 is transmitted from eBook server 310 to client device 320. eBook 350 can be received at client device 320 with or without narration 354. In one example, narration 354 is generated by client device 320 and associated with eBook 350. After creating narration 354, client device 320 transmits eBook 350 back to eBook server 310. eBook server 310 receives the eBook and determines that this eBook has changed (narration has been added). Upon the determination, eBook server 310 creates a new unique AdamID for the eBook with narration and attaches the AdamID to eBook 350. eBook 350 with narration can then be saved in eBooks database 314. eBook server 310 can also optionally update client profiles 312 so that eBook 350 is associated with its intended recipient.

eBook 360 can also be transmitted from eBook server 310 to client device 320. eBook 360 includes content 362. A narration application running on client device 320 can be used to generate a narration file 370. Narration file 370 can include narration that corresponds to content 362 of eBook 360. After creation of narration file 370, the narration file can be transmitted to eBook server 310 for storage. Narration file 370 can be received by eBook server 310 and stored in narrations database 318. Narration file 370 can be stored in the database using a unique narration identifier. The intended recipient of the narration can be stored in table 316 along with the unique narration identifier to allow eBook server 310 to retrieve narration file 370 from narrations database 318 for the recipient at a future point in time. Optionally, another table configured to map narrations to customers that have rights to gift or otherwise grant access to the narration can be included in system 300.

In one embodiment, system 300 can grant temporary access rights to eBooks for narration purposes. Access to eBooks and narration files is managed by client profiles. A customer of the eBook server can gain access to eBooks and narration files by purchasing the eBook, receiving the eBook as a gift, or otherwise acquiring the eBook. eBooks that have been acquired can be associated with the customer's client profile. eBooks that are associated with a customer's client profile can be downloaded and re-downloaded on various devices operated by the customer or devices that the customer has logged into or are otherwise associated with the customer. In some examples, the client profile of a narrator may not be associated with the eBook which the narrator is narrating. For example, a narrator may wish send an eBook as a gift to a recipient but wish to narrate the book before gifting. If the narrator does not own a copy of the eBook (and thus cannot download the eBook to the narrator's device), eBook server 310 can grant temporary rights to the narrator, thus enabling the narrator to download a copy of the eBook for narration purposes. The temporary rights may act like a rental period of a predetermined period of time (e.g., 48 hours, one week, etc.) in which eBook server 310 allows the narrator to download a copy of the eBook. Once eBook server 310 receives the narration from the narrator or the rental period expires, the narrator's temporary access to the eBook can be removed or revoked. If the narrator owns a copy of the eBook, temporary rights do not need to be granted to the narrator for purposes of narration. Alternatively, an eBook with an expiration date can be transmitted to the narrator. Once the narration has been created or once the expiration date has passed, the eBook can expire and no longer be accessible. Narrations that have been created can be transmitted to the intended recipient, optionally with the eBook. The recipient can receive a notification that the eBook and narration have been gifted.

Figure 4:
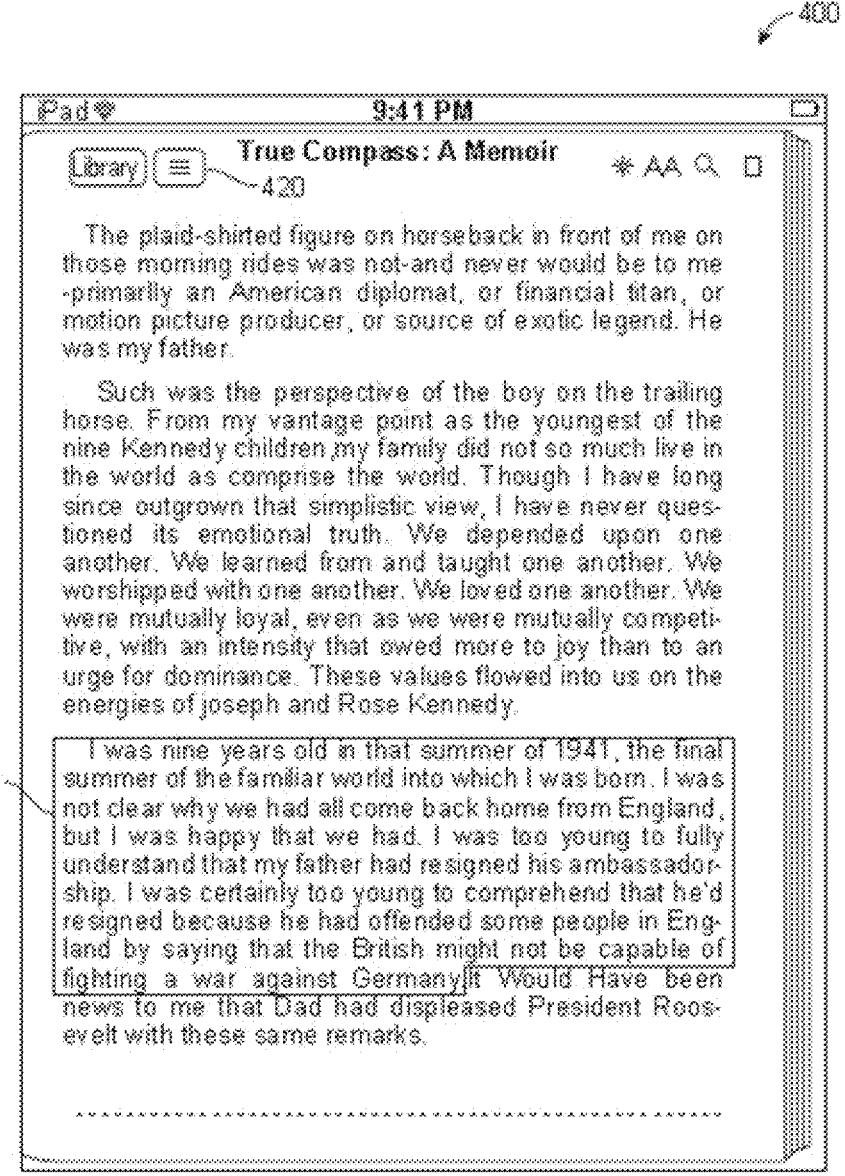
FIG. 4 illustrates an exemplary user interface embodiment for creating a narration.

FIG. 4 illustrates an exemplary user interface embodiment for creating a narration. As shown, eBook 400 titled "True Compass: A Memoir" is being displayed on an electronic device. The electronic device can be portable and can include components typically found in a computing device such as a processor, a memory containing computer readable instructions, and an output device such as a display. Although eBook 400 is shown here in a portrait orientation, the eBook can also be displayed in a landscape orientation in other examples. The orientation and the eBook presented on the display can be controlled by a reader application running on the electronic device. The orientation shown can depend on reader preference or the orientation of the electronic device. In some examples, the electronic device can combine a display with other input/output devices to present digital media items to the user. An exemplary reader application is Apple Inc.'s iBooks™ application and an exemplary electronic device is Apple Inc.'s iPhone™ or iPad®.

Besides the reader application, a narration application can also run on the electronic device. The narration application can be configured to create the narration. The narration application can further be configured to present the eBook in a similar fashion as the reader application to create a seamless transition between narration and playback. In some examples, the narration application and the reader application can be the same application. An eBook narration can include multiple audio snippets. The audio snippets can be associated with a word, a body of text, or an image in the eBook. As the narrator reads aloud a word, a body of text, or discusses aloud an image, an audio snippet can be captured by a microphone of the narrator's device. The audio snippet can be associated with the word, body of text, or the image. The audio snippets can collectively form a narration, which can be stored along with the eBook content or separately in a narration file. Depending on the configuration of the narration application, the audio snippets can be associated on a per word, sentence, paragraph, page, or chapter basis.

The narration application can be triggered to record a narration upon detection of a predetermined event. The predetermined event can be a menu option or a touch gesture. For example, a selectable menu option can be configured to start a recording of a narration when selected. Selection of the menu option can begin the process to generate a narration for the page, paragraph, or chapter of the eBook. The entire eBook can also be narrated upon selection of the menu option. As another example, a touch gesture such as a touch and hold can be configured to initiate the narration of a selected element (word, sentence, paragraph, page, image, etc.) of the eBook. An audio snippet can be subsequently recorded and associated with the selected element from the eBook. In yet other examples, pause, record, playback, and scan controls can be available to the user via a touch interface on eBook 400. For instance, the electronic device displaying eBook 400 can include a touch sensitive display. The controls can be presented on the touch sensitive display and can be selectable via touch. The controls can provide one method for the user to record narrations and review recorded narrations. In some instances, the controls can be made available or unavailable to the user via a menu option. For example, a user may prefer to use the controls to record and playback the narrations and thus selects to make the controls available. A different user may prefer to use touch gestures to record and playback the narrations and thus prefers to hide the controls in order to reduce clutter on eBook 400. Thus, multiple ways can be provided to the user to record and playback narrations.

Voice commands can also be detected to trigger a predetermined event. For example, a predetermined event can be triggered when a predetermined phrase, word, or sound is detected by the electronic device. When the predetermined event is the beginning of a recording session, the same or different predetermined phrase, word, or sound can be subsequently detected to signify the end of the recording session. In other examples, other voice commands can be received to trigger the beginning of an audio snippet, the end of an audio snippet, an instruction to play back or preview an audio snippet, an instruction to stop playback of an audio snippet, an instruction to scan through an audio snippet, an instruction to turn the page, and other instructions.

In some examples, a predetermined event can trigger the end of one audio snippet and the beginning of another audio snippet. For example, an audio snippet associated with a first page can end when a command is received to advance to the next page. When the next page of the eBook is presented on the display, a new audio snippet can begin. In other examples, the end of an audio snippet and the beginning of another audio snippet can be automatically determined. For example, the narration application can be configured to create an audio snippet per sentence. When the speech recognition application determines that a sentence has been read, the audio snippet associated with that sentence can be saved and a new audio snippet can be created for the next sentence. Determination that a sentence has ended can be based on pauses by the narrator or characters of text in the eBook. For example, a period, exclamation point, or other characters used to signify the end of a sentence can be used to automatically begin and end audio snippets.

For example, a narrator can read aloud text on a page after triggering a predetermined event. As the narrator reads the text, the narrator's voice is captured by a microphone of the electronic device and saved as an audio snippet that is associated with the page. When a different page is presented on the display, a different audio snippet is created and stored. During playback, a reader may request to open a page of the eBook. When the page is presented on the electronic device, the audio snippet associated with the page may be played back through a speaker of the electronic device for the reader. Thus, playback would be similar to a read aloud book.

In another embodiment, visual cues can be incorporated into the narrating and playback functionality. Visual cues such as highlighting, underlining, boldfacing, and italicizing can be used to guide or pace the narrator as he or she reads a page of the eBook aloud. In one example, visual cues can be applied to text on a page to highlight to the narrator the portion of the page that should be read. By reading the text when the visual cues are applied, the narration application can associate an audio snippet with a portion of text. Furthermore, the narration application can control the speed of the narration by controlling the rate at which the visual cue is applied to the text. In some examples, a narration speed parameter can be adjusted on the narration application to control the rate at which the narration is recorded. In some embodiments, the narrator can drag their finger or stylus across/under the words of the page as they are reading them so that the device can align the recorded audio with the narration. In some embodiments, speech recognition technology can be incorporated into the narration application to verify that the narrator is reading the correct text or that the audio recording is understandable. The verification can occur per audio snippet, per page, per chapter, or once some other segment of the eBook has been narrated. During playback, a playback speed can also be set by the playback application to speed up or slow down the playback. Visual cues, such has highlighting can optionally be applied during playback to visually assist the reader to locate the text that the narrator is reading aloud. In some examples, digital processing techniques can be used to process the narration file and speed up or slow down the playback speed. The speech recognition technology can be performed on the client device or on the online store.

In FIG. 4, text segment 410 of eBook 400 has been highlighted by the narrating application. The narrator reads the words as they are highlighted. The narrating application can temporarily stop the highlighting at the end of a sentence or paragraph until the narrating application determines that narration has completed for the highlighted section. Text can be un-highlighted after a predetermined event has occurred. The predetermined event can be detecting that the narrator has reached the end of a sentence, a paragraph, or a page. Alternatively, the predetermined event can be that audio snippets associated with the highlighted text has been verified and accepted by the narration application. The predetermined event can also be a receipt or a touch gesture, audio trigger, or other input. For example, highlighting will not continue to the next sentence until the narration application determines that the narrator has completed narrating the current sentence. In one example, previously read portions of text in the paragraph can remain highlighted until the entire paragraph is read. At this point in time, the entire paragraph can be un-highlighted. In another example, the narration application can optionally verify that the narration is accurate for the block of text. Once the entire paragraph has been read and optionally verified, the paragraph can be un-highlighted. The narration functionality can be turned on and off by using a user selectable option in a menu accessible by icon 420.

In another embodiment, the narrator can read aloud the eBook at his or her own pace. Visual cues can be configured to provide feedback to the narrator during narration. For example, words that have been read aloud by the narrator and recorded by the narration application can be highlighted. This can provide dynamic, real-time feedback to the narrator to distinguish text that has been read and text that has yet to be read. The narration application can use speech recognition to determine which portions of the text that have been read. Portions of text that have been read can be highlighted. Speech recognition can also be used in associating the text to recorded audio snippets of the narrator's voice. Here, the electronic device has recorded an audio snippet of the narrator's voice. The electronic device can use speech recognition to determine that the audio snippet coincides with text 410. Once the determination has been made, the electronic device can provide a visual cue to text 410 as a means to notify the narrator that the narration of text 410 has been recorded. In some examples, text 410 can remain highlighted until the complete paragraph has been recorded. Once that happens, the entire paragraph, including text 410, can be un-highlighted. In other examples, words of text on a page can remain highlighted until the page changes. This can allow a narrator to verify that an audio snippet has been recorded for all text on the page.

In some examples, the visual cues can include multiple levels of highlighting. The type of highlighting used can include color highlights, bolding, underlining, italicizing, or a combination of the above. The different levels of highlighting can be used to signify different steps in the narration process. For example, the narration application can be configured to highlight text a first color during a first pass of a speech recognition engine. The first pass may process only particular words to help locate where which sentence the narrator has read aloud. After the first pass, the narration application can be configured to highlight text a second color during a second pass of the speech recognition engine. The second pass can include a verification step to confirm that the narrator has accurately read each word. If verification is successful, the words can change transition from the first color to the second color. If the verification is unsuccessful, the inaccurately read words can transition to a third color as a way to quickly identify the portions of the text that may need to be re-read. In one example, the sentence or words that are to be re-read can be selected by using a touch user interface. For instance, a narrator can hold and touch words or sentences that have been highlighted the third color to initiate re-recording of that word or sentence. Once the narrator selects the word or sentence that has failed verification via a touch interface, a new audio snippet can be recorded for that word or sentence. The new audio snippet can be used to replace the portion that has failed verification. The audio snippets can be combined to form a narration that is mapped to the eBook for future playback.

In one embodiment, the narration application can automatically generate audio snippets and associate the audio snippets with text in the eBook. The narration application can use previously recorded audio snippets of the narrator's voice to interpolate speech characteristics of the narrator. The speech characteristics can be stored and subsequently used to automatically generate speech from text. Each new audio snippet recorded by the narration application can generate a new speech characteristic that is added to a speech characteristic set that represents the narrator's voice. Once the speech characteristic set associated with the narrator has reached a predetermined level of coverage in the spectrum of possible sounds or words in the English language (or alternatively a predefined number of speech characteristics have been stored), the narration application can presume to be able to imitate the narrator's voice. The narration application can provide an option to automatically convert text in the eBook to speech and store the speech as audio snippets associated with the text. During playback, the audio snippets can be played back as a visual cue is applied to the associated text.

Figure 5:
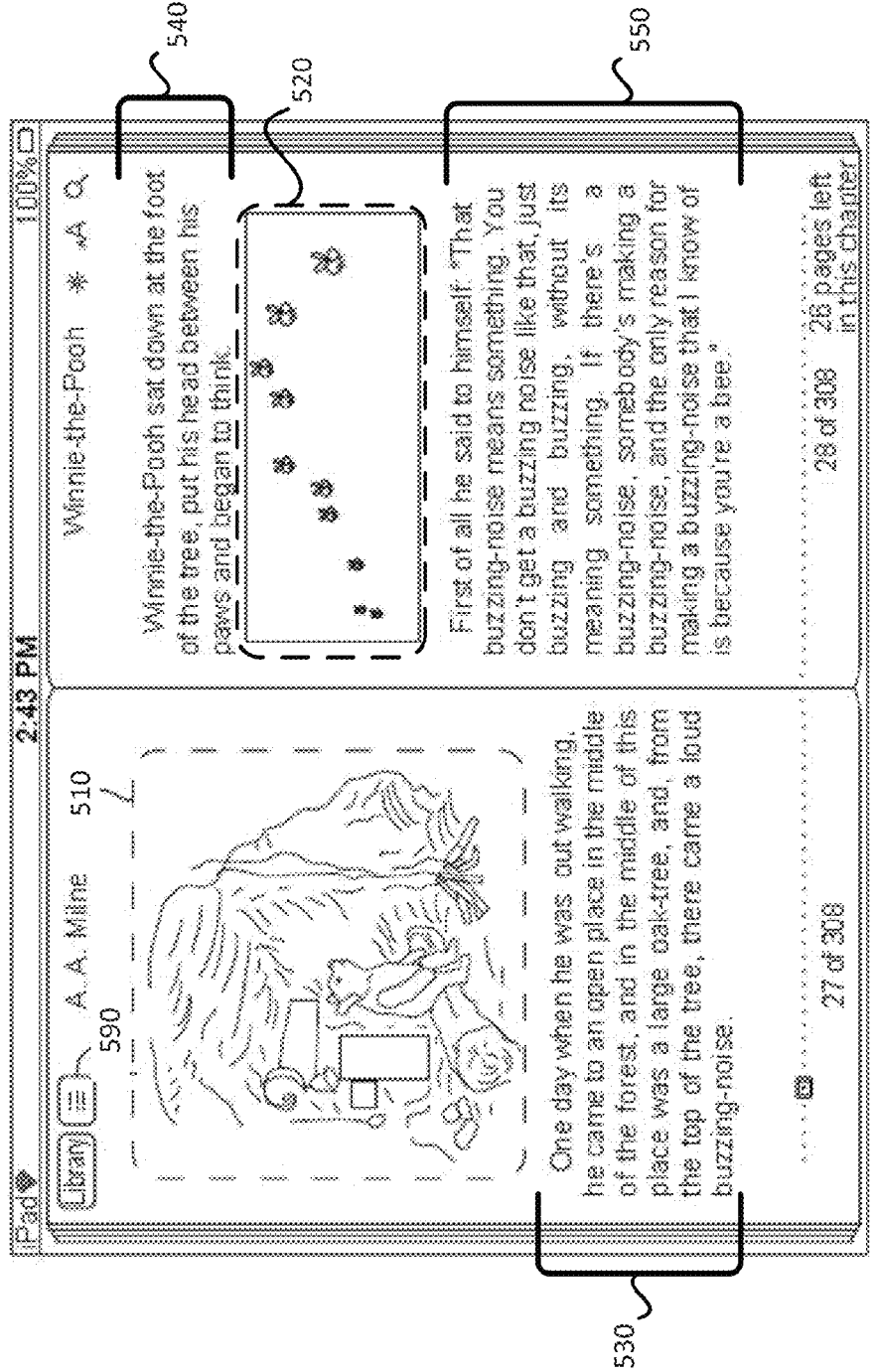
FIG. 5 illustrates another exemplary user interface embodiment for creating a narration.

FIG. 5 illustrates another exemplary user interface embodiment for creating a narration. As shown, eBook 500 titled "Winnie-the-Pooh" is being presented by the reader application. The eBook can be programmed to include hot spots. A hot spot is a predetermined area on the eBook that, when selected, triggers a predetermined event causing an action to occur. For example, selecting the hot spot can trigger an event that allows the user to attach an audio snippet to the element located at the hot spot. The hot spot area can be on the cover of the eBook, the table of contents, title page, images, text blocks, or other locations in the eBook. Furthermore, the hot spot area can be specified using a menu interface in the narration application. In one embodiment, the narration application can be configured to automatically identify or generate hot spots. The narration application can be configured to specify the granularity or the types of hot spots that will be automatically generated. For example, the narration application can be configured to place hot spots on images or text in the eBook, thereby making the images or text selectable by a user. Selection of the image can lead to attaching an audio snippet to the image. In other examples, the narration application can be configured to treat other elements of the eBook (e.g., videos, tables, charts, table of contents, title page, appendix, etc.) as hot spots.

In FIG. 5, the narration application has placed hot spots on images 510 and 520 of eBook 500. If the narrator wishes to attach an audio snippet to an image, the narrator can select the image by touching the image. Touching the image can trigger the hot spot, which presents a pull down menu to the narrator. The pull down menu can include an option to attach an audio snippet to the image. For example, a user selectable option for adding an audio snippet to the image can be included in a pull down menu of menu 590. Alternatively, selecting the image can result in a pop-up menu. A pop-up menu can be presented at or near the hot spot and include a selectable option to attach the audio snippet to the image.

In some examples, the predefined interaction event can be initiated through a touch gesture. For example, a narrator can touch and hold a hot spot on image 510 or 520 to initiate a predefined interaction event such as a narration event. Once the narration event has been triggered, the narration application can begin actively recording audio. The narration application can continue recording until it is determined that the narrator has released the hot spot. When the hot spot is released, the narration application can stop recording. Alternatively, the hot spot can be pressed to begin recording and pressed a second time to stop recording. The audio recording can be a time-bound audio snippet that is associated with the image. Images in the eBook that have an associated audio snippet can be identified using a visual cue during playback. For example, images with an associated audio snippet can be bolded, shadowed, blink, or otherwise made apparent to a reader that an audio snippet can be played through a speaker when the image is selected. The image can be selected through a touch gesture.

In one embodiment, elements in eBook 500 can be associated with default audio snippets. The default audio snippets can be generated by the publisher. Alternatively, a speech to text application on the online store can generate default audio snippets for portions of text in the eBook. In some examples, default audio snippets can be associated with certain types of text. For example, default audio snippets can be pre-generated by the publisher for descriptive text. Here, text block 530 and 540 describe the scene, background, actions of the characters, surroundings, and other descriptive language that is not spoken by a character. As such, these portions of text can be categorized as descriptive text and can be associated with default audio snippets that were pre-generated by the publisher. A narrator can optionally generate personal audio snippets for text block 530 or 540 by selecting the text block. In contrast, to descriptive text, spoken text (e.g., text spoken by characters) is text that is spoken by a character. A narration application can differentiate between different types of text by searching for predefined special characters in the text. For example, the narration application can look for quotes, keywords (e.g., "said," "stated," "exclaimed," etc.) or names of characters to distinguish spoken text from descriptive text. The narration can also look for other text cues to signify where descriptive or spoken text begins and ends. In one example, default audio snippets can be generated for descriptive text in the eBook but not for spoken text in the eBook. The default audio snippets can be generated by the online store or an application running on a client device on demand. For example, if the narration application were to determine that a default audio snippet is required for a portion of text that will not be narrated, the default audio snippet can be generated as requested. Alternatively, the eBook can be provided from the publisher with default audio snippets for a portion or all of the text in the eBook. Default audio snippets for un-narrated portions of the eBook can be added to the narration file. This can provide a simplified process for providing narration to an eBook by allowing a narrator to focus on personalizing portions of the eBook that would the gain most from narration, mainly spoken text. In other examples, eBook can be configured to identify the different types of texts and optionally identify each character. A narrator can select from the available characters for which he or she would like to narrate. During narration, visual cues can be applied to spoken text for the selected character in the eBook. In yet other examples where default audio snippets are available for all text in the eBook, different options can be available from the narration application to narrate the entire book, the descriptive text, or only select character or characters in the eBook. Here, the narration application determines that text block 550 is spoken text because the text block is surrounded by quotes. The narration application can search text nearby block 550 or examine metadata associated with text block 550 to determine the speaker of text block 550. If the speaker is one of the selected characters for narration, visual cues such as highlighting can be applied to text block 550 to notify the narrator that text block 550 requires narration. The narrator can read-aloud text block 550 as a microphone of the electronic device running the narration application captures the narrator's voice and generates an audio snippet. The audio snippet can optionally be verified for accuracy.

Figure 6:
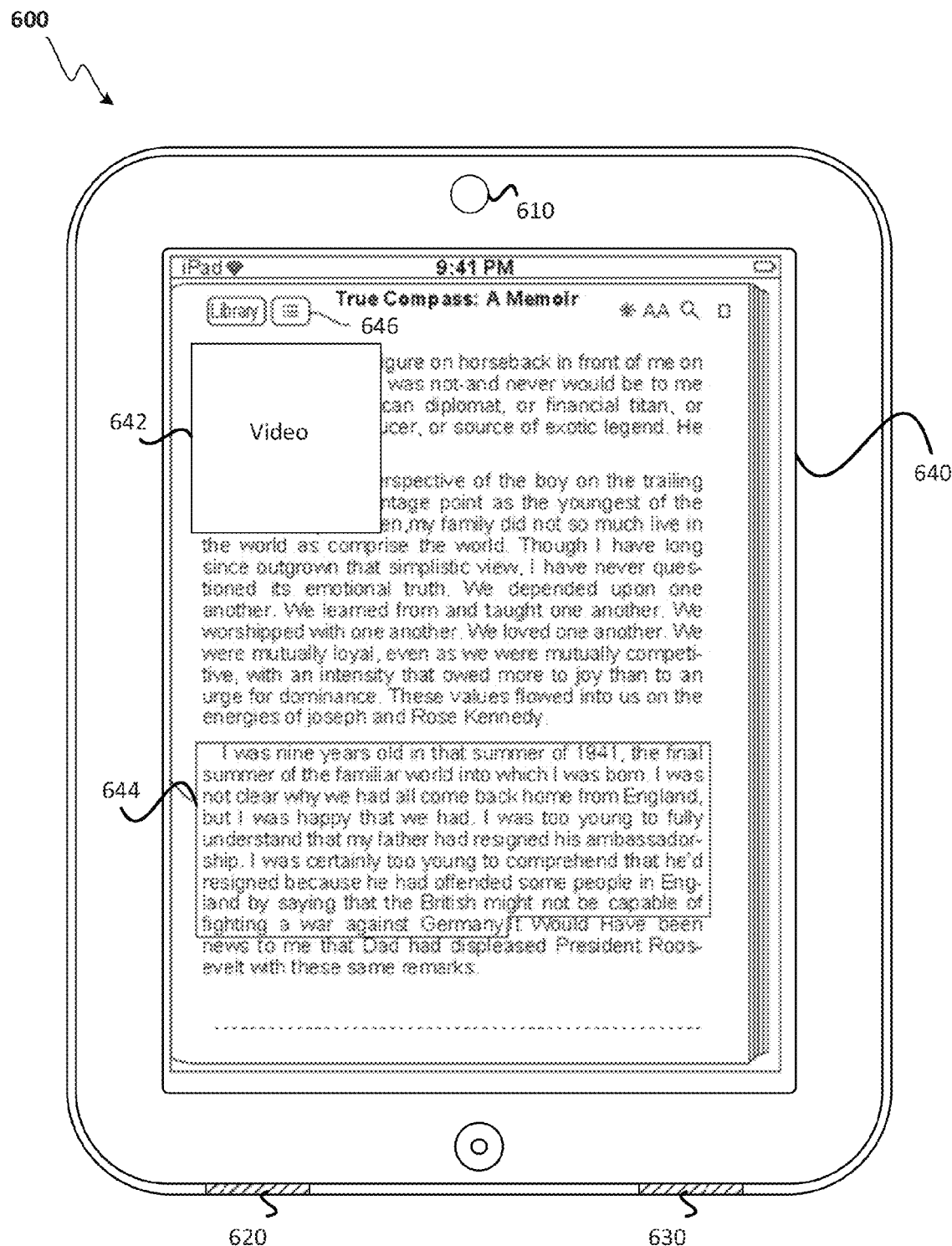
FIG. 6 illustrates another exemplary user interface embodiment for creating a narration.

FIG. 6 illustrates another exemplary user interface embodiment for creating a narration. As shown here, electronic device 600 is displaying an eBook on display 640. Electronic device 600 includes four input/output components: camera 610, speaker 620, microphone 630 and display 640. In other examples, electronic device 610 can have more or fewer components.

Display 640 can include video box 642. In one example, video box 642 can overlay the text of the eBook. In another example, the text of the eBook can wrap around video box 642. In yet another example, video box 642 can be semi-transparent, thereby allowing the underlying text to remain semi-visible. Although video box 642 is shown in this figure as residing in the top left corner, video box 642 can also be located in other areas of display 642. In some examples, video box 642 can be moved around to other locations of display 640 by the user operating electronic device 600. For example, touch gestures such as hold and drag can be used to move video box 642 to other locations of display 640. In other examples, video box 642 can be configured to automatically relocate to different predetermined locations of display 640 to avoid blocking text, images, or other elements presented on display 640 as they are being narrated by the narrator or read by the reader. For example, video box 642 can be located at the bottom of the screen when the top of the page is being narrated or read. When the narrating or reading transitions to the bottom of the page, video box 642 can be relocated to the top of the screen. Video box 642 can also be resized by the narrator or reader.

Video box 642 can be configured to perform numerous tasks. In one embodiment, video box 642 can be configured to supplement the narration with a video snippet. For example, a narrator recording a narration for an eBook can elect to include video in the narration. The election can be made through menu 646. If video is elected, video box 642 can be activated and presented to the narrator. Video box 642 can present a video snippet captured by camera 610. The narrator can view the video capture as it is being recorded and either accept or reject the video capture. Alternatively, the video capture and video box 642 can be presented on a device other than the narrator's device. For example, a video capture by camera 610 can be transmitted to a non-narrator's device and presented on a video box. Here, electronic device 600 is currently capturing narration for text 644. As the narrator reads text 644, microphone 630 captures the narrator's voice and camera 610 captures the narrator's face. The narrator's face can be presented on video box 642 for the narrator to review. The video capture along with the audio snippet can be associated with the text for future playback on narrator's device or a recipient's device.

In another embodiment, video box 642 can be configured to present a video feed to the narrator. For example, a third party listening to the narration as it is being recorded can provide a live video feed of the third party as he or she listens to the narration being recorded. This can allow the narrator to see the emotions and reactions of the third party as he or she listens to the narration. Gauging the emotions and reactions of the narrator's audience can prove to be useful feedback to the narrator as the narrator creates the narration.

In another embodiment, the video box can be presented as a recipient plays back the narration. During playback, video capture of the narrator plus an audio snippet of the narrator's voice can be simultaneously presented to the recipient. The video box may change its location as text is read.

Creating a Live Narration

As described above, a narration can be created by a narrator, stored on a server, and subsequently transmitted along with the eBook to its intended recipient. In other embodiments, the narration can be created in a live setting by one or more narrators. One or more narrators can collaborate in a narration session to create the narration. In scenarios where there are multiple narrators, each narrator can read a portion of the eBook. In eBooks with multiple character roles, each narrator can read for one or more characters. An audience can optionally join in the narration session to experience and potentially give feedback on the narration as it is being created.

In one embodiment, the narration session can be hosted by an electronic device. The host device can initiate a narration session that other electronic devices can join. The other electronic devices in the narration session can be operated by narrators or audience members. In one example, the host device can select the electronic devices to send invitations to join the narration session. In another example, the host device can broadcast a signal to other electronic devices to inform them of the narration session. For instance in a study group scenario, a host device can broadcast a narration session on a local area network (or wide area network or internet or other telecommunication network) or Bluetooth signal (or WiFi or other short distance direct communication) to look for others in the study group that would like to join the narration session. In some examples, joining the narration session can require a passcode.

In one example, a screen sharing session can be created between the host device and one or more other electronic devices. Screen sharing can allow the contents displayed on the screen of one device to be transmitted and displayed on the screen of another device. For example if the host device is viewing a page of an eBook, screen sharing can allow another device to also view the same page of the eBook. This can allow users who do not own a copy of the eBook to join the narration session by sharing the view of the host device.

If a participant of the narration session would like to manipulate the eBook (e.g., change the page, add narration to an element in the eBook, etc.), instructions to manipulate the eBook can be transmitted to the host device and executed by the host device. For example, another narrator can transmit to the host device instructions to change the page or to attach an audio snippet to the eBook. The host device can in turn process the instructions, which can result in a change to the contents presented on the display of the host device. Changes to the display of the host device can trigger the propagation of data to other devices in the narration session so that all devices in the narration session are in sync. In sync can mean that all electronic devices in the narration session display the same page of the eBook along with the same visual cues. In sync can also mean that each electronic device in the narration session is capable of presenting a page of an eBook from a particular point of view. This can require the transmission of data from one device to another device for the presentation of the eBook from a point of view. For example, a narrator can be presented a given view of an eBook created from a narration application while an audience member can be presented a different view of the eBook generated from a playback application. For instance, a narrator can read aloud on the narrator's device a paragraph from the eBook. While reading, a narrator can select an image to attach narration to. The narrator's device may provide a visual cue to the selected image as the narrator's voice is recorded into an audio snippet. After recordation of the audio snippet, other devices may receive a visual cue (e.g., highlighting or blinking) from the narrator's device. The visual cue can be applied to the image selected by the narrator. If an operator of one of the other devices selects the image, the recorded audio snippet can be played back. Thus, both are presenting the same content at a location in the eBook but from a different viewpoint. The narrator's viewpoint of seeing a visual cue as the image is selected can be different than the audience's viewpoint of seeing a different visual cue when it is determined that the image has an associated audio snippet.

In some examples, participants of the screen sharing session that own the eBook can be configured to receive less data from the screen sharing session than participants that do not own a copy of the eBook. Participants that do not own a copy of the eBook may receive text of the eBook and the images in the eBook. This data does not need to be transmitted to members that own the eBook. As such, the screen sharing session may be configured to transmit different data packets or packages to participants based on whether or not they own a copy of the eBook. For participants that own a copy of the eBook, a marker and audio snippet associated with the marker can be transmitted from the host device. The marker and audio snippet can be used to display the contents that are currently on the display of the host device, thus allowing the devices to remain in sync with the host device. The bandwidth required to transmit a marker and an audio snippet can be less than the bandwidth required to transmit the page of the eBook along with the audio snippet and the marker. Hosting the narration session on an electronic device can have advantages such as the other optional narrators and audience of the narration session do not have to be customers of the online store. The audience and/or other narrators can receive a data stream such as a screen sharing session where the content presented on the host electronic device is broadcasted to the audience and/or other narrators of the eBook. Screen sharing can allow the participants (other narrators, audience members) in the live narration to participate the live narration without requiring the participants to own a copy of the eBook.

Figure 7:
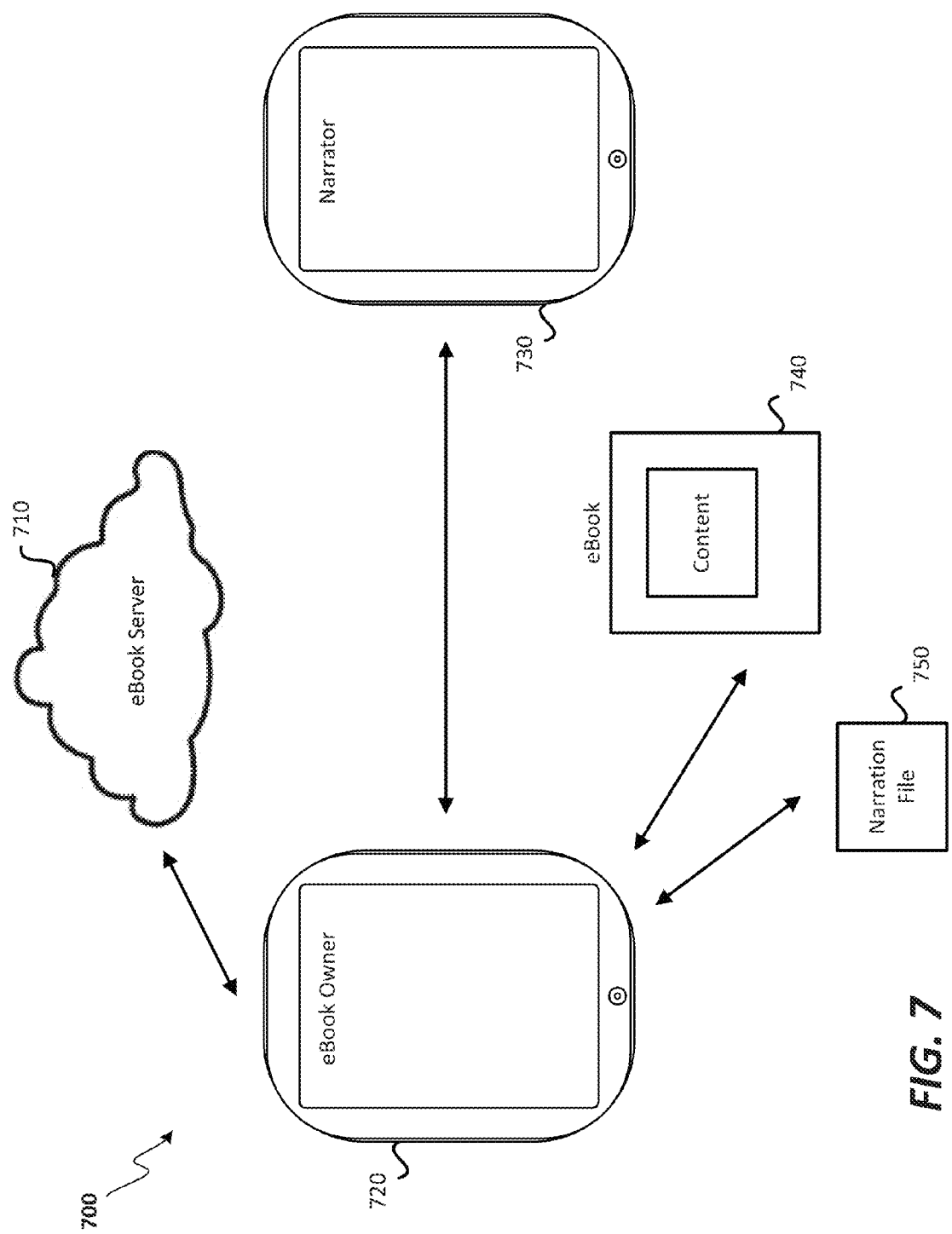
FIG. 7 illustrates an exemplary system for hosting a narration session on a host electronic device.

FIG. 7 illustrates an exemplary system for hosting a narration session on a host electronic device. As shown, system 700 includes eBook server 710, eBook owner's device 720, and narrator's device 730. eBook owner's device 720 is in communication with the eBook server 710. Since the operator of eBook owner's device 720 has a client profile stored on eBook server 710 that is associated with eBook 740, eBook server 710 allows eBook owner's device 720 to download eBook 740. Narrator's device 730 does not have a client profile on eBook server 710 and thus, cannot communicate with eBook server 710 to download eBooks or narration files from eBook server 710.

Here, the eBook owner would like to have eBook 740 narrated by narrator 730. eBook owner's device 720 can initiate a narration session with narrator's device 730. The narration session can include screen sharing to allow narrator's device 730 to indirectly access eBook 740 though eBook owner's device 720. Narrator's device 730 can transmit instructions to eBook owner's device 720 to narrate the eBook. For example, the instructions can include instructions to manipulate eBook 740 on device 720 or alternatively can include an audio snippet associated with a text block in eBook 740. The audio snippet can be played on eBook owner's device 720 and the word or blocks of text associated with the audio snippet can be highlighted on a display of eBook owner's device 720 as the audio snippet is played. In other examples, one or more of the playback features described above can be implemented on eBook owner's device 720 to present the narration to the eBook owner. The viewpoint of eBook 740 presented to eBook owner can be either as the narrator or as the reader. In other words, the display on eBook owner's device 720 can be a narrator's view what is shown on narrator's device 730 or alternatively, a playback view of what is shown on a reader's device.

In one embodiment, the eBook owner's device 720 can act as a slave device that is controlled by narrator's device 730. The content presented on a display of owner's device (and as a result of screen sharing also the narrator's device 730) is controlled by the narrator entering instructions into narrator's device 730. If narrator is a user of the eBook server, then the narrator can also temporarily download the eBook. Downloading the eBook can allow the narrator to bypass screen sharing or if the narrator wishes to use screen sharing, the screen sharing session can require less bandwidth since a copy of the eBook resides on narrator's device 730. Once the narration of eBook 740 has been completed, eBook owner's device 720 can create narration file 750. Narration file 750 can be transmitted to eBook server 710 for storage. If the eBook owner's access to eBook 740 was on a rental or temporary basis, the eBook owner's access to eBook 740 can be withdrawn. In other examples, other devices that have access to eBook server 710 can host the narration session.

In one embodiment, the bandwidth required for the narration session can be reduced when the devices in the narration session all have access to a copy of the eBook and the devices are initially synced. Initially syncing the devices can include synchronizing the location in the eBook that the narrator is to start reading and also the reading speed of the narrator. Once the narrator begins reading, a signal can be transmitted to the non-narrating devices informing them that the narration has started. At that time, the narrator's device can transmit a real-time feed of the narrator's voice to the non-narrating devices. As the real-time feed is received, the non-narrating devices can begin providing a visual cue to the text in the eBook to help the non-narrators follow the narration. The speed that the visual cue is applied to the text is based on the predetermined reading speed of the narrator. Changes to the reading speed during narration can be propagated to non-narrator devices, thus maintaining the pace between the narrator's voice and the application of visual cues to the text.

Figure 8:
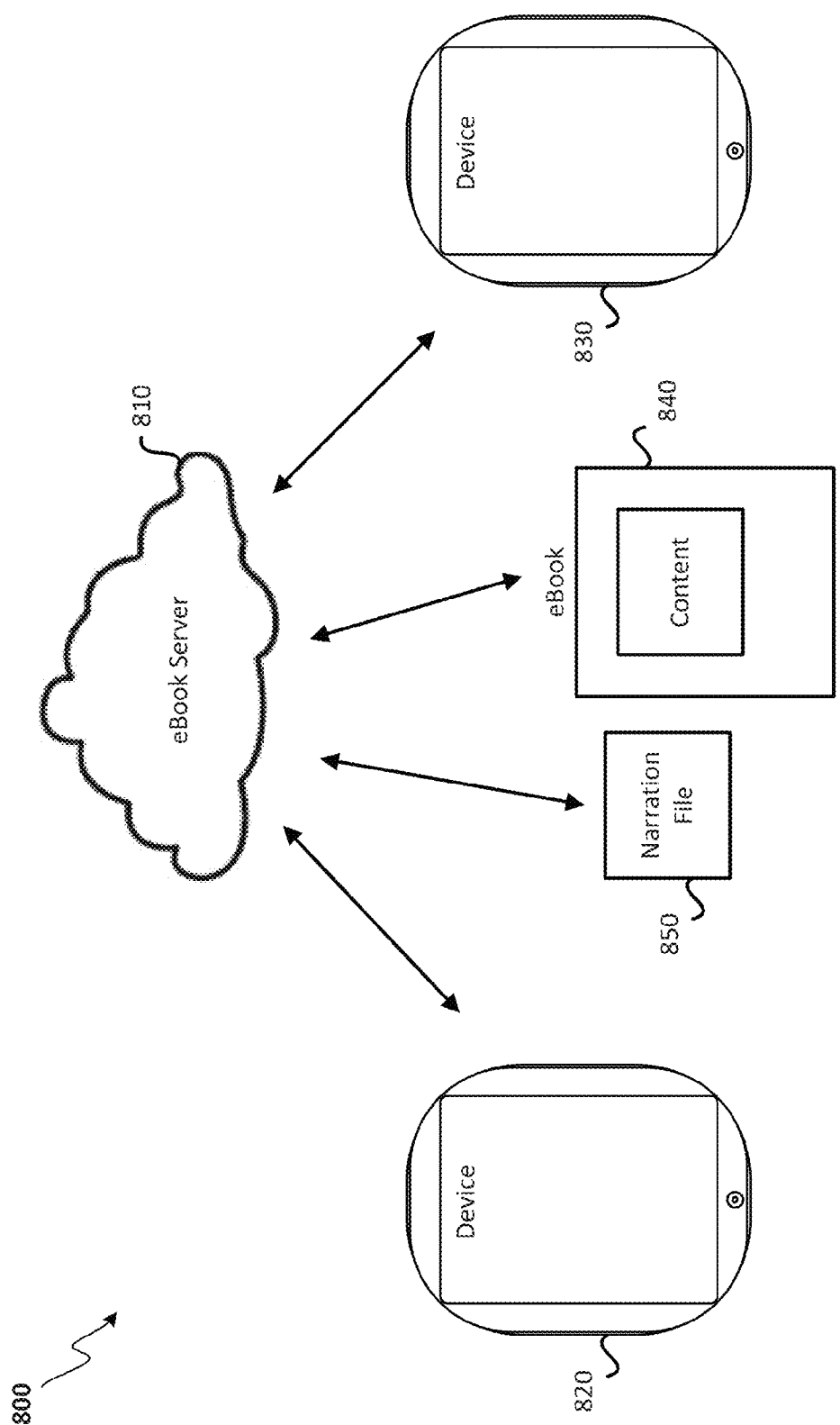
FIG. 8 illustrates an exemplary system for hosting a narration session on a server.

FIG. 8 illustrates an exemplary system for hosting a narration session on a server. As shown, system 800 includes eBook server 810, device 820, and device 830. eBook server can be configured to host a narration session. Devices operated by participants of the narration session (e.g., device 820 and device 830) have a client profile on eBook server 810. Thus, the participant's devices can communicate with eBook server 810 and receive eBooks and other data/metadata from eBook server 810. eBook server 810 can receive audio snippets associated with elements in eBook 840 from participant's devices and combine the audio snippets to form narration file 850. eBook server 810 can also set up the parameters surrounding the narration session such as the roles of each participant. For example, a participant can be assigned to read a character role in the eBook, descriptive text in the eBook, or other element in the eBook.

Here, a request to host a narration system can be received by eBook server 810 from device 820. The request can include the identifier of eBook 840 along with the other narrator of the narration session, device 830. eBook server 810 can create a narration session and transmit an invitation to device 830. Once the device 830 has accepted the invitation, eBook server 810 can transmit eBook 840 along with temporary access rights to participants (device 820 or device 830) who do not own a copy of eBook 840. Alternatively, a screen sharing session can be transmitted to device 820 and/or 830. The screen sharing session can be hosted by a device that owns a copy of eBook 840 or eBook server 810. Once all participants have access to an eBook or can view an eBook through screen sharing, the participants can create audio snippets for the narration. In other examples, the narrators in system 800 can communicate with eBook server 810 through a combination of screen sharing sessions and narration sessions.

In one embodiment, eBook 840 can be narrated in a sequential fashion. eBook server 810 can transmit to a narrator's device visual cues for text that the narrator is to read aloud. An audio snippet can be created from the narrator's voice and transmitted to the other participants of the narration session, including the eBook server 810. The other participants can playback the audio snippet to follow along in eBook 840. When the narrator changes, visual cues can be provided to a different narrator, who in response generates and transmits another audio snippet to the participants and optionally eBook server 810. eBook server 810 can be responsible for coordinating the transmission of visual cues to the participants and collecting the audio snippets to create the narration file. In some examples, a live feed of the narrator's voice can be broadcasted to the other participants as the narrator reads the text aloud. The other participants can hear the narrator's voice and follow along in the eBook, however the audio snippets are not stored on the other participant's devices. eBook server 810 saves all the audio snippets and forms the narration file.

In another embodiment, eBook 840 can be narrated in a simultaneous fashion. eBook server 810 can simultaneously transmit visual cues of text that needs to be read aloud to multiple devices. Each narrator can read aloud their portion of the eBook, create audio snippets of the reading, and transmit to eBook server 810 the audio snippets created. For example, device 820 and device 830 can receive visual cues for portions of the eBook that are to be read by their operators. In response to the visual cues, device 820 and 830 can generate and transmit audio snippets associated with their respective portions of the eBook to eBook server 810. By transmitting simultaneously transmitting requests for narration to the devices 820 and 380 through visual cues, multiple narrators can simultaneously generate audio snippets for text of eBook 840. eBook server can combine the generated audio snippets into narration file 850. This process can be quicker than the sequential fashion since multiple narrators can be recording audio snippets at the same time.

Figure 9:
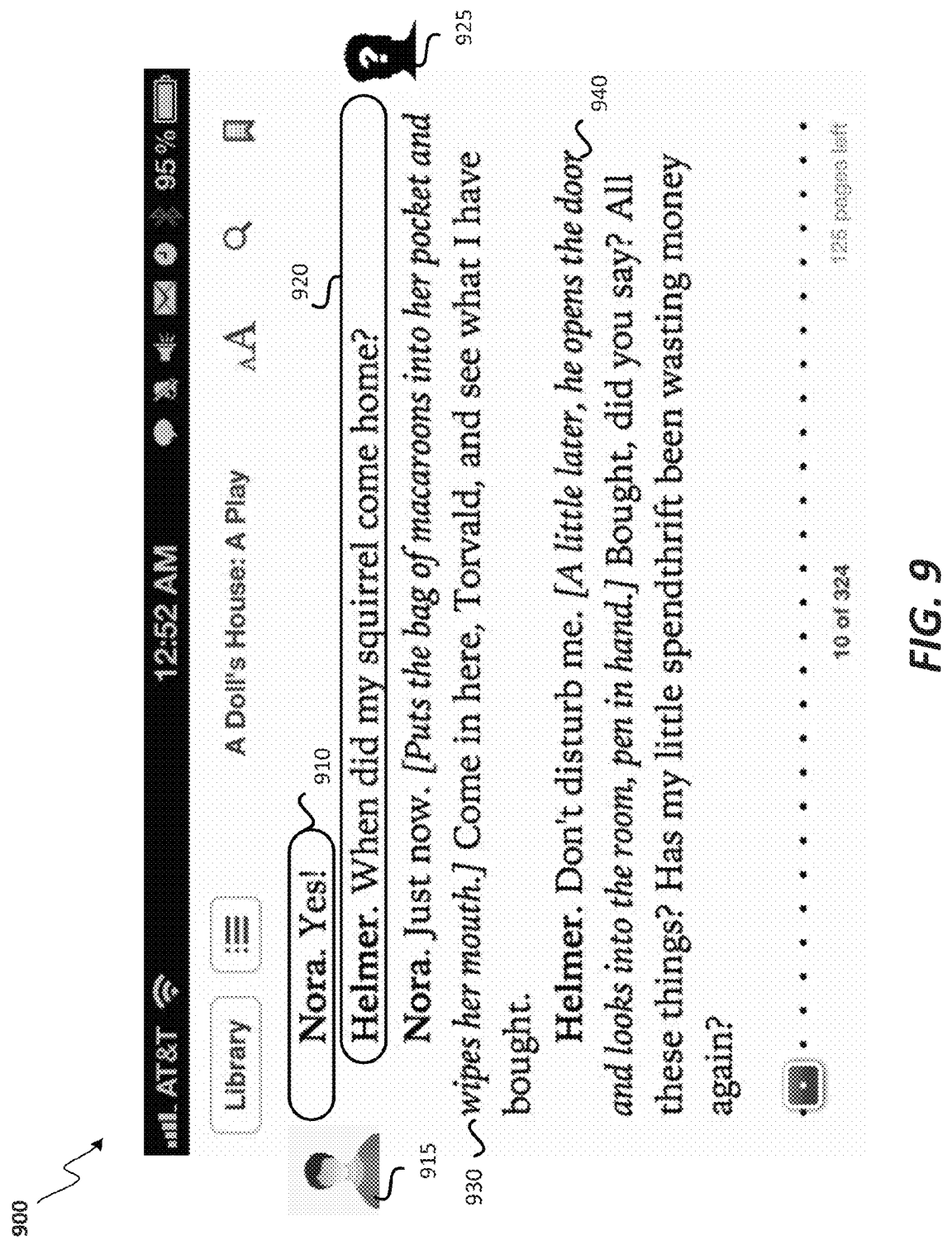

FIG. 9 illustrates an example of multiple narrators narrating a page of an eBook. As shown, page 900 of an eBook titled "A Doll's House: A Play" is being presented on an electronic device. Page 900 can be in part of a narration session where narrators of Nora and Helmer are about to read aloud their lines. The electronic device can be operated by the narrator of Nora, the narrator of Helmer, or an audience member. Highlight 910 can be applied to the first line signifying that the statement has already been read aloud by the narrator of Nora. Avatar 915 can also be presented substantially near or alongside the first line. Avatar 915 can be an image, a symbol, an avatar, a name, or any other identifier used to identify narrator Nora. Avatar 915 can appear on the display of devices other than the narrator's device in the narration session to help identify the party narrating the first line. Optionally, avatar 915 can also be displayed on narrator's device. Avatar 915 can be selected by the narrator or be assigned by the host of the narration session. In some examples, a highlighting color can also be included along with the avatar to further assist others in identifying the narrator. Highlight 910 can be in the highlighting color associated with the narrator.

The second line on page 900 belongs to Helmer. In one example, a visual cue such as blinking text, underlining, italicizing, or bolding can be applied to the second line on the narrator of Helmer's device to signify a request to narrate the second line. Once the narrator of Helmer has narrated the second line, the visual cue can change to a second visual cue. Here, the second line can change to highlight 920 of a highlight color associated with the narrator of Helmer. The narrator of Helmer has not set an avatar and as a result, avatar 925 of a question mark head is by default associated with the narrator of Helmer. Highlight 920 and avatar 925 can be presented to devices other than the narrator's device as the audio snippet recorded by the narrator is played back for the other devices. Optionally, highlight 920 and avatar 925 can also be presented on the narrator of Helmer's device.

The third line on page 900 belongs to Nora while the fourth line belongs to Helmer. The third and fourth lines include non-speech text. The navigation application can be configured to locate non-speech text. Here, the third and fourth lines include non-speech sentences 930 and 940. Non-speech sentences can be treated differently than speech sentences. For example, non-speech sentences can be narrated by another narrator. As a result, the sentences can be highlighted a different color. Alternatively, non-speech sentences can include default audio snippets. As a result, the sentences 930 and 940 can be highlighted a different color or a visual cue that is different than the visual to request a narrator to read a sentence can be applied to prevent a narrator from accidentally reading aloud the non-speech sentence. Keywords or special characters or visual cues can be predefined to help the narration application locate the non-speech portions. In this example, the non-speech portions are surrounded by brackets and are italicized.

For example, on the narrator of Nora's device, the third line can begin with the sentence "Just now." blinking. This would notify Nora's narrator that the sentence should be read aloud. After reading the first sentence, the notification application can highlight sentence 930 a color that is different than the color associated with Nora's narrator. Nora's narrator would hear via a speaker on the device the sentence "Puts the bag of macaroons in her pocket and wipes her mouth." After that sentence is heard through the speaker, the third sentence "Come in here, Torvald, and see what I have brought." can be blinking to notify Nora's narrator to read aloud the third sentence. In other examples, the non-speech sentences can be skipped. In yet other examples, different scheme of visual cues and avatars can be used to identify multiple narrators reading from a single page.

Notifications

Figure 10:
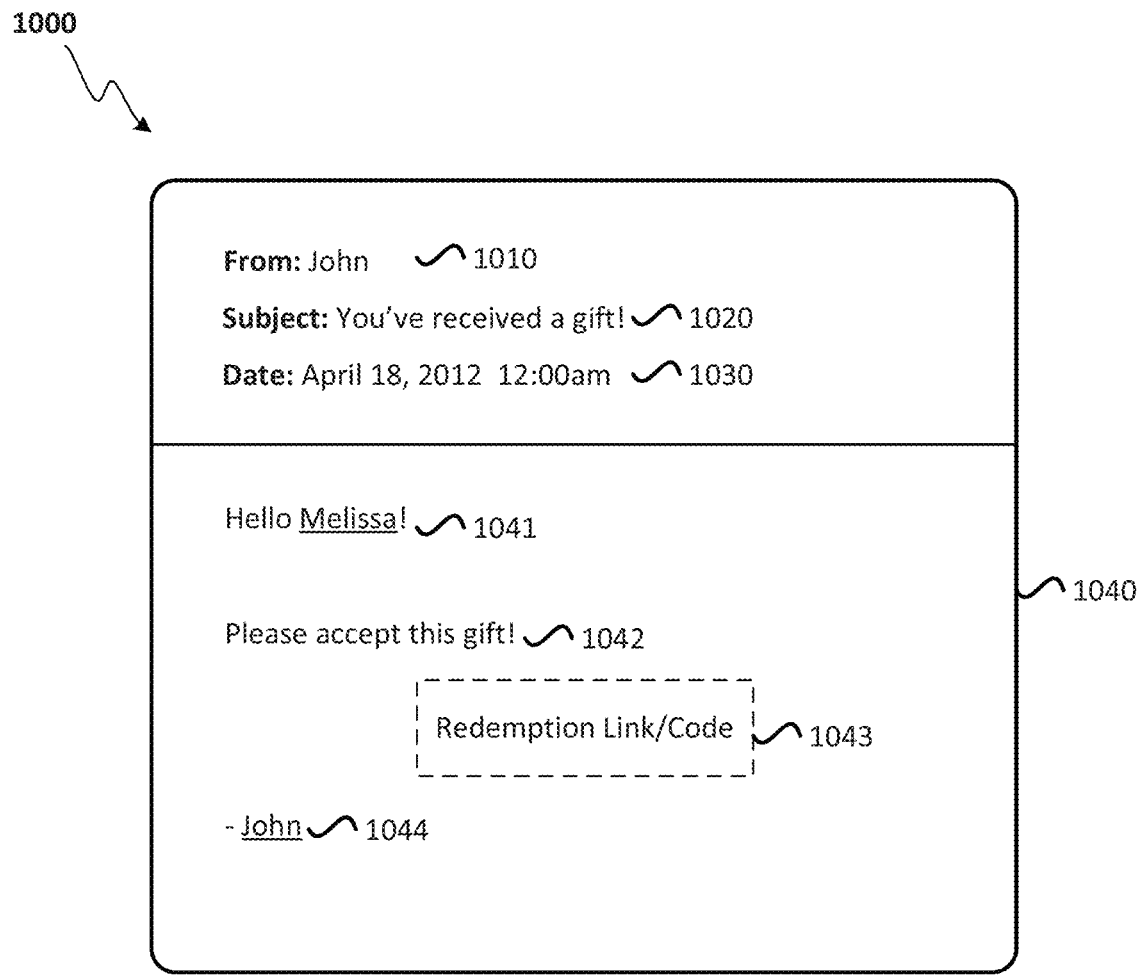
FIG. 10 illustrates an exemplary notification.

FIG. 10 illustrates an exemplary notification. Notification 1000 is an exemplary email to notify the recipient of an incoming gifted narrated eBook. The notification can be transmitted from an online store to an email account associated with the recipient's user account. Alternatively, the notification can also be transmitted from a mail server associated with the gifter's email account to the recipient's email account. As shown, notification 1000 includes a sender field 1010. Sender field 1010 displays the name of the party that sent the email. In some examples, sender field 1010 can be automatically populated with the formal name associated with the gifter's user account. Here, sender field 1010 is automatically populated with the name "John." Notification 1000 can also include subject field 1020. Subject field 1020 provides the recipient a description of the subject matter in this email. In some examples, subject line 1020 can be automatically populated with a generic statement such as "You've received a gift!" or "You've received a gift from <gifter's name>!" In other examples, the subject can be manually provided by the gifter. Notification 1000 can also include date stamp 1030. Date stamp 1030 provides information about the time and/or date that the email was sent from the gifter. In some examples where the gifter requests a scheduled delivery, the email can be sent at a date and time specified by the gifter.

Notification 1000 can further include message body 1040. Message body 1040 can be automatically generated, manually generated, or manually generated with portions of the message that are automatically populated. Message body 1040 can include recipients name 1041, text 1042 notifying the recipient that the gifter has sent a copy of the digital media item as a gift, and the name of the gifter 1043. In examples where the online store does not automatically associate the gifted digital media item to the recipient's user account (thus offering the recipient the option to re-gift or deny the gifted digital media item), a redemption link or code 1043 can be included in message body 1040. The redemption link or code 1043 can also include links to accept or deny the gifted digital media item. Based on the response received from the recipient, the online store can associate the gifted digital media item to the recipient's user account. Signature 1044 can be applied at the end of the message.

Figure 11:
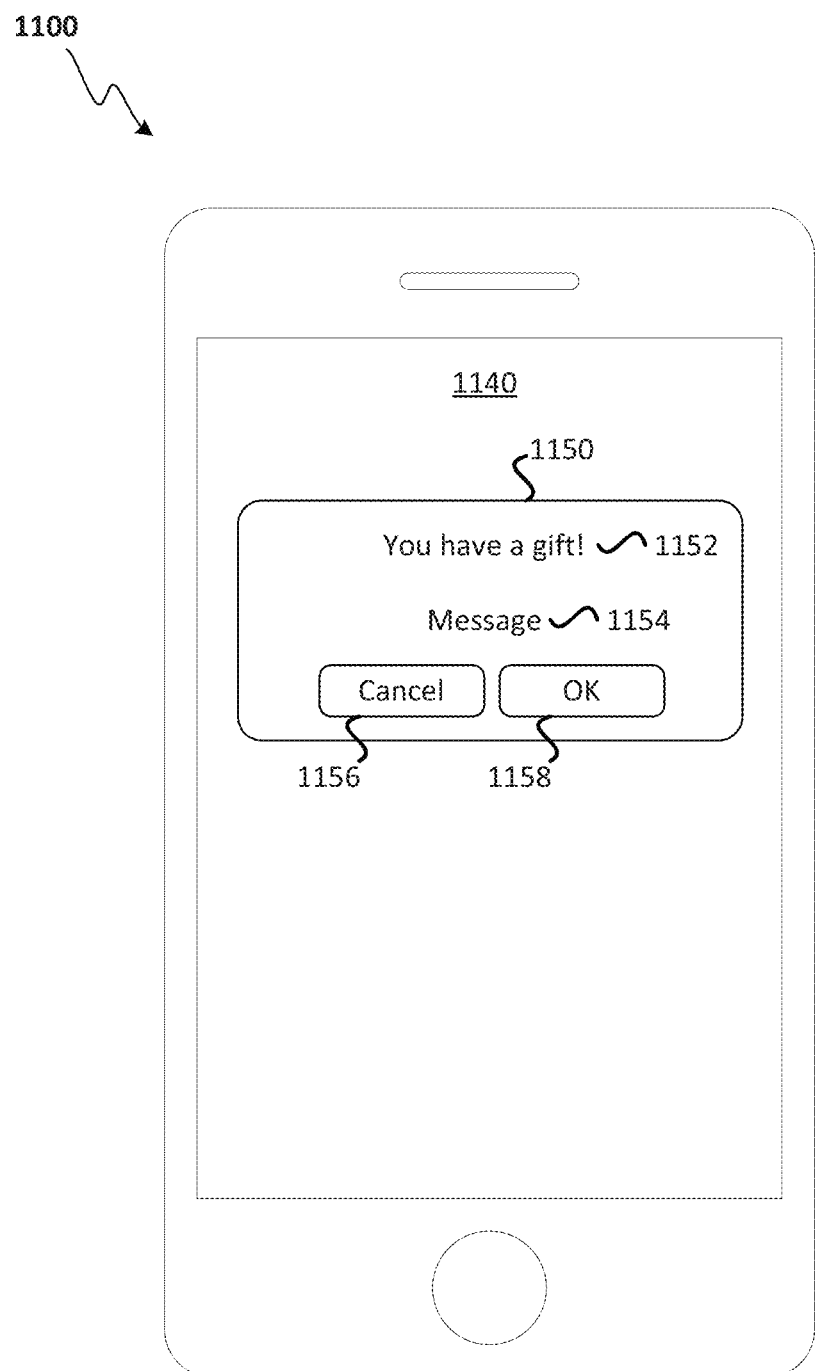
FIG. 11 illustrates another exemplary notification.

FIG. 11 illustrates another exemplary notification. Notification 1150 received on electronic device 1100 and displayed on display 1140 is a push notification. A push notification is a communication initiated by the cloud or other central server that is sent to a recipient. Push notifications allow a recipient to receive updates or new messages without having to initiate a request to the central server for communications. Notification 1150 can be a text message that is received on electronic device 1100, a pop-up notification received on electronic device 1100, or other notification received by electronic device 1100. As shown here, notification 1150 includes title 1152, message 1154, and options 1156 and 1158. Title 1152 can be a title line associated with notification 1150, such as "You have a gift!" Similarly message 1154 can be a message describing the contents of notification 1150. For example, the message can state "<Gifter> has gifted you a copy of <title of digital media item>. Would you like to accept the gift?" In some examples, message 1154 can include a redemption code to redeem the gift. In some examples, title 1152 and/or message 1154 can be automatically generated by the device operated by the gifter or the online store.

Options 1156 and 1158 can provide the recipient user-selectable options to respond to the message. There can be more or fewer options. For example, the recipient can cancel notification 1150 by selecting option 1156. By cancelling the notification, electronic device 1100 does not respond to the notification. However, electronic device 1100 can still respond to notification 1150 at a later point in time through an application on electronic device 1100 that maintains received notifications. Alternatively, the user can accept the gift by selecting option 1158. When the user accepts the gift, a notification can be sent from electronic device 1100 to inform the online store that the recipient has accepted the gift. As a result, the online store can adjust the ownership rights associated with the recipient's user account accordingly. In some examples, selecting option 1158 can link the user to another application configured to manage ownership rights of the recipient. The recipient can review the digital media items owned and decide whether to accept the gift.

Exemplary Methods

Figure 12:
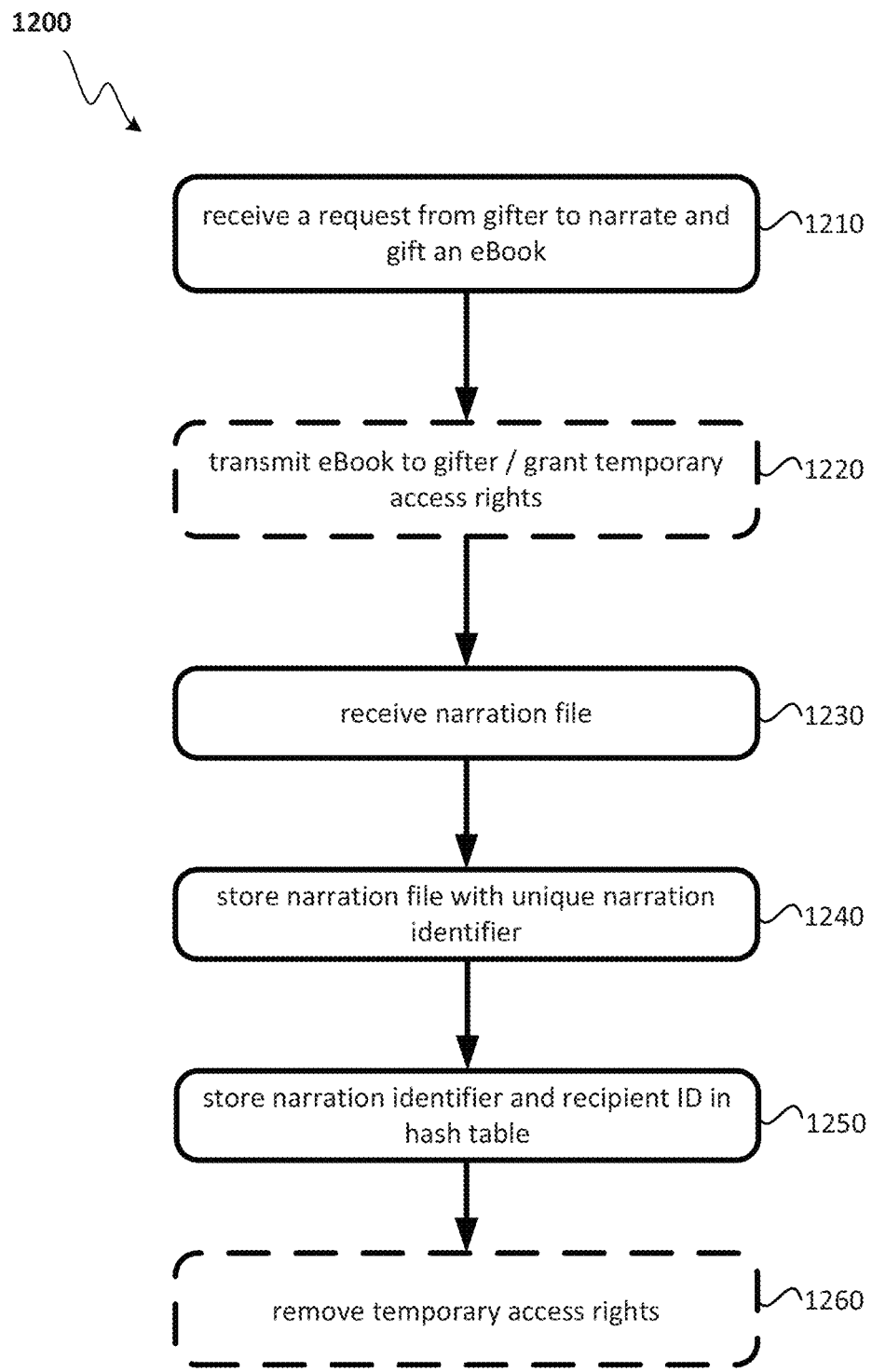
FIG. 12 illustrates an exemplary process for narrating and gifting an eBook.

FIG. 12 illustrates an exemplary process for narrating and gifting an eBook. The process can be stored as computer readable code and processed by a processor, such as a server on an online store. Process 1200 receives a request from a gifter to narrate and gift an eBook (1210). The request can include an identifier of the eBook and a recipient. In one example, the eBook selected can include a narration file. The gifter can supplement the narration or alter the existing narration, resulting in the generation of a new narration file. For instance, the eBook can come with default narration. The gifter can replace the default narration associated with some text in the eBook with the gifter's own voice. After the request has been received, the eBook and/or temporary access rights can optionally be granted to the gifter (1220). Temporary access rights to the eBook may be granted to the gifter when the gifter does not own a copy of the eBook. With the temporary access rights, the gifter can access to the eBook for a period of time similar to a rental which allows the gifter to narrate the eBook without having to purchase the eBook. In one example, granting the temporary rights can include transmitting a copy of the eBook to the gifter where the copy has an expiration date. After the expiration date, the eBook becomes inaccessible. In another example, granting the temporary rights can include updating the client profile of the gifter to include the eBook. This can allow the gifter to download and play the eBook. After a predetermined period of time, the eBook can be removed from the gifter's client profile.

Once the gifter has received the eBook, the gifter can narrate the eBook on the gifter's device. A narration file can be generated and transmitted to the processor. Once the narration file is received (1230), the narration file can be saved with a unique narration identifier (1240). The unique narration identifier can be used to uniquely identify the narration file. This can allow the narration file to be retrieved from the database based on the unique narration identifier. After the narration file is saved, the unique narration identifier and a recipient ID can be stored in a data structure (1250). In one example, the data structure is a hash table. A hash can be used to map a recipient ID to one or more narration file identifiers that are associated with the recipient. The narration file identifiers can then be used to retrieve the associated narration files for the recipient. After the data structure has been populated with the narration identifier, the gifter's temporary access rights to the eBook are removed (1260). At this point, the gifter no longer has access to use the eBook. If the gifter wishes to continue using the eBook, the gifter may purchase a copy of the eBook from an online store.

Figure 13:
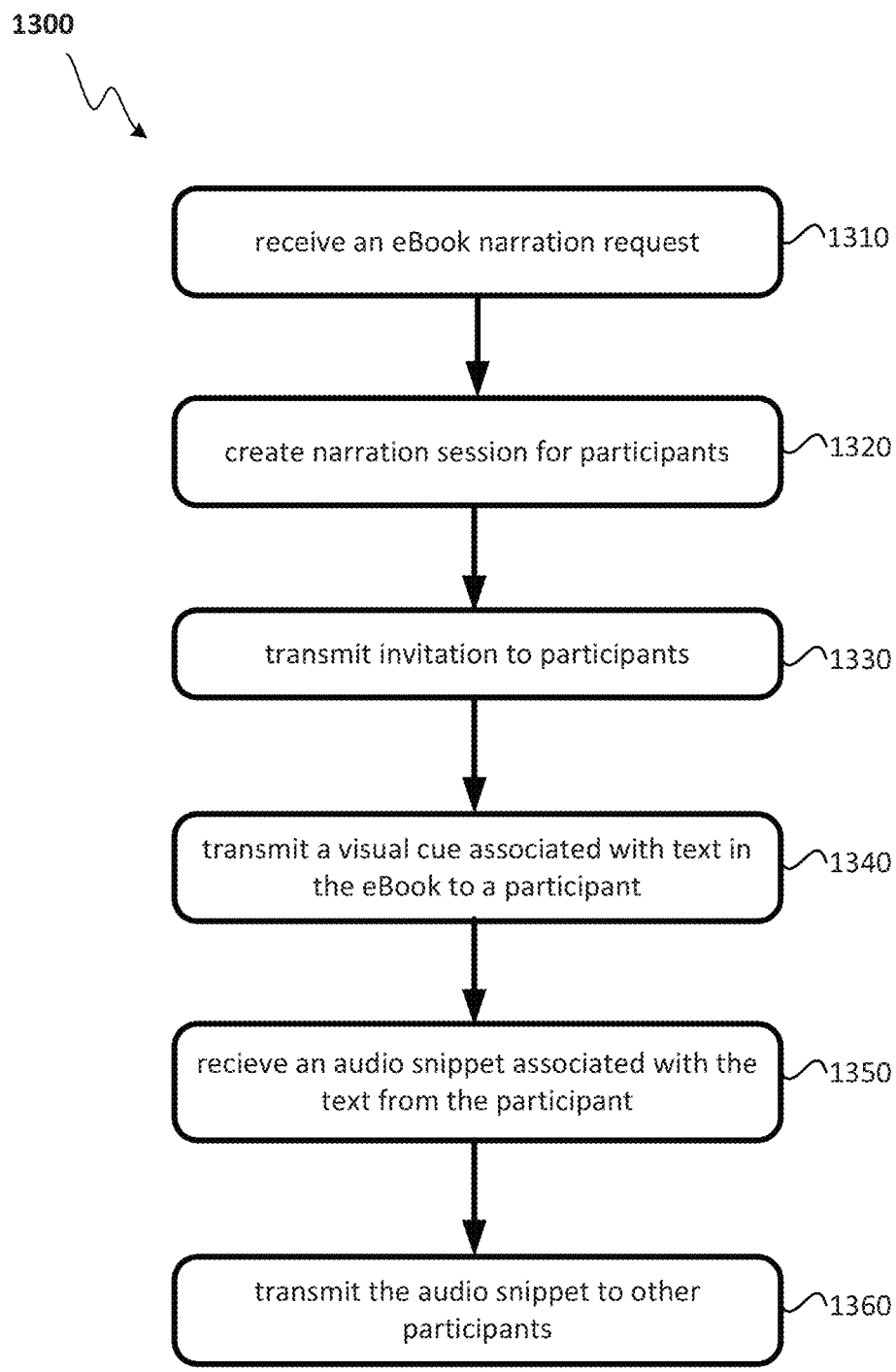
FIG. 13 illustrates another exemplary process to create narration for an eBook.

FIG. 13 illustrates another exemplary process to create narration for an eBook. The process can be stored as computer readable code and processed by a processor, such as a server on an online store. The processor performing the instructions can be configured to host a narration session between one or more narrators. The processor executing process 1300 receives an eBook narration request (1310). The request can be sent from an electronic device operated by a narrator. After receiving the request, a narration session can be created for the participants (1320). Tasks such as audio snippets generated by one participant of the narration session can be broadcasted or otherwise propagated to other participants of the narration session. More specifically, audio snippets generated by a participant can be transmitted to the processor, stored at the processor, and retransmitted to the other participants. This can allow all participants of the narration session to have access to the same set of audio snippets and thus the same narration. The narration session can include a narration session ID to identify the narration session. Transmissions from participants can include the narration session ID to help the processor route traffic. An invitation including the narration session ID can be transmitted to participants (1330). The invitation can also include temporary access rights to the eBook in case the participant does not own the eBook. The temporary access rights can end when the narration session ends. When it is time for a participant to read aloud text from the eBook, a visual cue associated with the text can be transmitted to the participant (1340). The type of visual cue can be configured by the participant or the processor. In response to the visual cue, an audio snippet associated with the text can be received from the participant that received the visual cue. The audio snippet can be saved. After receiving the audio snippet, the audio snippet can be transmitted to other participants (1360). This allows the other participants to remain in sync with one another in terms of the status of the narration. In one example, the audio snippets can include a visual cue associated with the participant that generated the audio snippet. The audio snippet can be played back as the visual cue is applied to the text associated with the audio snippet. This can allow playback of the audio snippet to be associated with the participant that read aloud the text.

Figure 14:
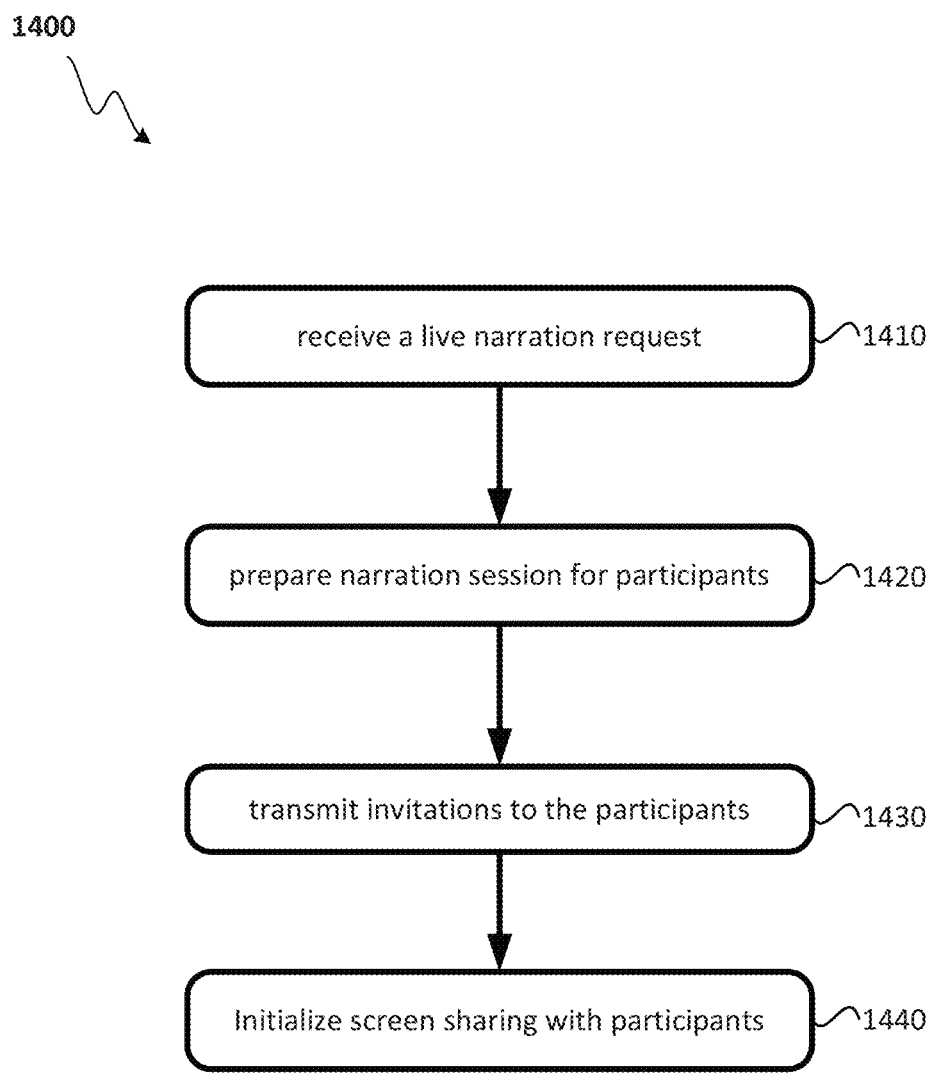
FIG. 14 illustrates another exemplary process for processing a live narration request.

FIG. 14 illustrates another exemplary process for processing a live narration request. The processor executing process 1400 receives a live narration request (1410). A live narration request can be a request for a real time data stream between two participants where one party in real time records a narration for another party and the other party can listen to the narration as it is being created. The live narration request can include a video box which provides a video feed of the narrator's face as he or she reads aloud text in the eBook. After the request is received, a narration session can be prepared for the participants. The narration session can include a narration session ID and optionally a dedicated data stream configured to host the live narration. Data transmissions between the participants can be transmitted across the dedicated data stream to ensure that network congestion does not affect the performance of the live narration. Invitations to the narration session can be transmitted to the participants (1430). Once the participants accept the invitation, a screen sharing session can be initialized between the participants (1440). The screen sharing session can allow participants that do not own a copy of the eBook to still view the eBook by streaming pages of the eBook from other participants or from the processor. Participants that do not own a copy of the eBook can also transmit commands to perform tasks to the eBook such as change the page or record an audio snippet to another participant in the screen sharing session. Alternatively, the commands can be transmitted to the processor. Once the screen sharing is initialized, the participants can generate a narration by collaboratively reading text blocks from the eBook. Audio snippets generated from reading aloud the text blocks can be generated and stored. The audio snippets can be transmitted to the processor, where they can be combined to form a narration file.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, solid state drives, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied other types of files to control the secure deletion of those files and other copies of those files from storage. Those skilled in the art will readily recognize various modifications and changes that may be made to the principles described herein without following the example embodiments and applications illustrated and described herein, and without departing from the spirit and scope of the disclosure.

We claim:

1. A computer implemented method comprising:
receiving a request to initiate a live narration session between a plurality of participants to collaboratively narrate an electronic book;
initiating the live narration session between the plurality of participants via an electronic book server;
associating a first narration role in the electronic book with a first participant from the plurality of participants, and a second narration role in the electronic book with a second participant from the plurality of participants, wherein the first participant has ownership access rights to the electronic book and the second participant has temporary access rights to the electronic book;
transmitting a request to the first participant to read aloud a portion of text in the electronic book that is associated with the first narration role;
receiving an audio snippet from the first participant, the audio snippet being associated with the portion of text; and
transmitting the audio snippet to the plurality of participants other than the first participant during the live narration session.

2. The computer implemented method of claim 1, further comprising granting one or more of the plurality of participants temporary access rights to the electronic book when the one or more of the plurality of participants does not own the electronic book.

3. The computer implemented method of claim 2, wherein the temporary access rights expire at the end of the narration session.

4. The computer implemented method of claim 1, further comprising verifying the audio snippet for accuracy using speech recognition technology.

5. The computer implemented method of claim 4, wherein instructions to apply a first visual cue to the portion of text is transmitted to the first participant when the audio snippet is received and instructions to apply a second visual cue to the portion of text is transmitted to the first participant when the audio snippet is verified.

6. The computer implemented method of claim 1, further comprising:

analyzing the audio snippet for one or more speech characteristics;

adding the one or more speech characteristics to a speech characteristic set associated with the first participant; and automatically generating another audio snippet for another portion of text in the electronic book that is associated with the narration role in accordance to the speech characteristic set when the speech characteristic set has reached a predetermined level of coverage.

7. The computer implemented method of claim 1, further comprising:

receiving, from the first participant, another audio snippet associated with an image in the electronic book;

storing the another audio snippet in the narration file; and transmitting the another audio snippet to the plurality of participants other than the first participant, wherein the image is presented to the plurality of participants with a visual cue to signify that the image has an associated audio snippet.

8. The computer implemented method of claim 1, further comprising:

retrieving default audio snippets for un-narrated portions of the electronic book; and storing the default audio snippets in the narration file.

9. The computer implemented method of claim 8, wherein the default audio snippets are generated by an online store.

10. The computer implemented method of claim 8, wherein the default audio snippets are retrieved from the electronic book.

11. The computer implemented method of claim 1, wherein the at least two participants view the electronic book through a screen sharing session, the screen sharing session allowing contents of the electronic book presented to the first participant with access rights to the electronic book to also be presented to the second participant without access rights to the electronic book.

12. The computer implemented method of claim 1, further comprising:

receiving a video feed from the first participant, and transmitting the video feed to the plurality of participants other than the first participant.

13. The method of claim 1, wherein the live narration session is performed sequentially from the beginning of the electronic book to the end of the electronic book.

14. A non-transitory computer readable medium comprising computer program code causing a device to:

receive a request to initiate a live narration session between a plurality of participants to collaboratively narrate an electronic book;

initiate the live narration session between the plurality of participants via an electronic book server;

associate first narration role in the electronic book with a first participant from the plurality of participants, and a second narration role in the electronic book with a second participant from the plurality of participants, wherein the first participant has ownership access rights to the electronic book and the second participant has temporary access rights to the electronic book;

transmit a request to the first participant to read aloud a portion of text in the electronic book that is associated with the first narration role;

receive an audio snippet from the first participant, the audio snippet being associated with the portion of text;

store the audio snippet in a narration file; and transmit the audio snippet to the plurality of participants other than the first participant during the live narration session.

15. The non-transitory computer readable medium of claim 14, further comprising computer program code causing the device to grant one or more of the plurality of participants temporary access rights to the electronic book when the one or more of the plurality of participants does not own the electronic book.

16. The non-transitory computer readable medium of claim 15, wherein the temporary access rights expire at the end of the narration session.

17. The non-transitory computer readable medium of claim 14, wherein instructions to apply a first visual cue to the portion of text is transmitted to the first participant when the audio snippet is received and instructions to apply a second visual cue to the portion of text is transmitted to the first participant when the audio snippet is verified.

18. The non-transitory computer readable medium of claim 14, further comprising computer program code causing the device to:

analyze the audio snippet for one or more speech characteristics;

add the one or more speech characteristics to a speech characteristic set associated with the first participant; and automatically generate another audio snippet for another portion of text in the electronic book that is associated with the narration role in accordance to the speech characteristic set when the speech characteristic set has reached a predetermined level of coverage.

19. The non-transitory computer readable medium of claim 14, wherein the at least two participants view the electronic book through a screen sharing session, the screen sharing session allowing contents of the electronic book presented to the first participant with access rights to the electronic book to also be presented to the second participant without access rights to the electronic book.

20. The non-transitory computer readable medium of claim 14, further comprising computer program code causing the device to verify the audio snippet for accuracy using speech recognition technology.

21. The non-transitory computer readable medium of claim 14, further comprising computer program code causing the device to:

receive, from the first participant, another audio snippet associated with an image in the electronic book;

store the another audio snippet in the narration file; and transmit the another audio snippet to the plurality of participants other than the first participant, wherein the image is presented to the plurality of participants with a visual cue to signify that the image has an associated audio snippet.

22. The non-transitory computer readable medium of claim 14, further comprising computer program code causing the device to:

retrieve default audio snippets for un-narrated portions of the electronic book; and store the default audio snippets in the narration file.

23. The non-transitory computer readable medium of claim 22, wherein the default audio snippets are generated by an online store.

24. The non-transitory computer readable medium of claim 22, wherein the default audio snippets are retrieved from the electronic book.

25. The non-transitory computer readable medium of claim 14, further comprising computer program code causing the device to:

receive a video feed from the first participant, and
transmit the video feed to the plurality of participants other than the first participant.

26. The non-transitory computer readable medium of claim 14, wherein the live narration session is performed sequentially from the beginning of the electronic book to the end of the electronic book.

27. A computer implemented method comprising:

receiving a request to initiate a live narration session between a plurality of participants to collaboratively narrate an electronic book;
initiating the live narration session between the plurality of participants via an electronic book server;
associating a first narration role in the electronic book with a first participant from the plurality of participants and a second narration role in the electronic book with a second participant from the plurality of participants, wherein the first participant has ownership access rights to the electronic book and the second participant has temporary access rights to the electronic book;
transmitting a request to the first participant to read aloud a first portion of text in the electronic book that is associated with the first narration role;
receiving a first audio snippet from the first participant, the first audio snippet being associated with the first portion of text;
storing the first audio snippet in a narration file;
transmitting the first audio snippet to the plurality of participants other than the first participant during the live narration session;
transmitting a request to the second participant to read aloud a second portion of text in the electronic book that is associated with the second narration role;
receiving a second audio snippet from the second participant, the second audio snippet being associated with the second portion of text;
storing the second audio snippet in the narration file; and
transmitting the second audio snippet to the plurality of participants other than the second participant during the live narration session.

28. A system for live collaborative narration of an electronic book, the system comprising:

a processor; and
a memory comprising instructions, which when executed by the processor cause the processor to:
receive a request to initiate a live narration session between a plurality of participants to collaboratively narrate an electronic book;
initiate the live narration session between the plurality of participants via an electronic book server;
associate first narration role in the electronic book with a first participant from the plurality of participants, and a second narration role in the electronic book with a second participant from the plurality of participants, wherein the first participant has ownership access rights to the electronic book and the second participant has temporary access rights to the electronic book;
transmit a request to the first participant to read aloud a portion of text in the electronic book that is associated with the first narration role;
receive an audio snippet from the first participant, the audio snippet being associated with the portion of text;
store the audio snippet in a narration file; and
transmit the audio snippet to the plurality of participants other than the first participant during the live narration session.

29. The system of claim 28, further comprising instructions which when executed cause the processor to grant one or more of the plurality of participants temporary access rights to the electronic book when the one or more of the plurality of participants does not own the electronic book.

30. The system of claim 29, wherein the temporary access rights expire at the end of the narration session.

31. The system of claim 30, wherein instructions to apply a first visual cue to the portion of text is transmitted to the first participant when the audio snippet is received and instructions to apply a second visual cue to the portion of text is transmitted to the first participant when the audio snippet is verified.

32. The system of claim 28, further comprising instructions which when executed cause the processor to:

analyze the audio snippet for one or more speech characteristics;
add the one or more speech characteristics to a speech characteristic set associated with the first participant; and
automatically generate another audio snippet for another portion of text in the electronic book that is associated with the narration role in accordance to the speech characteristic set when the speech characteristic set has reached a predetermined level of coverage.

33. The system of claim 28, wherein the at least two participants view the electronic book through a screen sharing session, the screen sharing session allowing contents of the electronic book presented to the first participant with access rights to the electronic book to also be presented to the second participant without access rights to the electronic book.

34. The system of claim 28, further comprising instructions which when executed cause the processor to verify the audio snippet for accuracy using speech recognition technology.

35. The system of claim 28, further comprising instructions which when executed cause the processor to:

receive, from the first participant, another audio snippet associated with an image in the electronic book;
store the another audio snippet in the narration file; and
transmit the another audio snippet to the plurality of participants other than the first participant, wherein the image is presented to the plurality of participants with a visual cue to signify that the image has an associated audio snippet.

36. The system of claim 28, further comprising instructions which when executed cause the processor to:

retrieve default audio snippets for un-narrated portions of the electronic book; and
store the default audio snippets in the narration file.

37. The system of claim 36, wherein the default audio snippets are generated by an online store.

38. The system of claim 36, wherein the default audio snippets are retrieved from the electronic book.

39. The system of claim 28, further comprising instructions which when executed cause the processor to:

receive a video feed from the first participant, and
transmit the video feed to the plurality of participants other than the first participant.

40. The system of claim 28, wherein the live narration session is performed sequentially from the beginning of the electronic book to the end of the electronic book.

* * * * *